(12) United States Patent
Kirkpatrick et al.

(10) Patent No.: US 11,711,108 B2
(45) Date of Patent: Jul. 25, 2023

(54) UNIVERSAL TRANSMIT/RECEIVE MODULE FOR RADAR AND COMMUNICATIONS

(71) Applicant: Eridan Communications, Inc., Mountain View, CA (US)

(72) Inventors: Douglas A. Kirkpatrick, San Francisco, CA (US); Earl W. McCune, Jr., Santa Clara, CA (US)

(73) Assignee: Eridan Communications, Inc., Sunnyvale, CA (US)

( * ) Notice: Subject to any disclaimer, the term of this patent is extended or adjusted under 35 U.S.C. 154(b) by 12 days.

(21) Appl. No.: 17/813,267

(22) Filed: Jul. 18, 2022

(65) Prior Publication Data

US 2022/0368368 A1     Nov. 17, 2022

Related U.S. Application Data

(63) Continuation of application No. 16/871,899, filed on May 11, 2020, now Pat. No. 11,476,890, which is a
(Continued)

(51) Int. Cl.
*H04B 1/48*       (2006.01)
*H01Q 3/36*       (2006.01)
(Continued)

(52) U.S. Cl.
CPC ............ *H04B 1/48* (2013.01); *G01S 7/032* (2013.01); *G01S 13/02* (2013.01); *H01Q 3/247* (2013.01);
(Continued)

(58) Field of Classification Search
CPC . H04B 1/48; G01S 7/032; G01S 13/02; G01S 2013/0245; H01Q 3/247; H01Q 3/36
(Continued)

(56) References Cited

U.S. PATENT DOCUMENTS 4,368,469 A * 1/1983 Ott ........................... G01S 3/46
342/368
4,791,421 A * 12/1988 Morse ..................... H01Q 3/26
342/368

(Continued)

*Primary Examiner* — Nuzhat Pervin
(74) *Attorney, Agent, or Firm* — Patent Law Professionals, P.C.; William E. Winters

(57) ABSTRACT

A universal transmit-receive (UTR) module for phased array systems comprises an antenna element shared for both transmitting and receiving; a transmit path that includes a transmit-path phase shifter, a driver, a switch-mode power amplifier (SMPA) that is configured to be driven by the driver, and a dynamic power supply (DPS) that generates and supplies a DPS voltage to the power supply port of the SMPA; and a receive path that includes a TX/RX switch that determines whether the receive path is electrically connected to or electrically isolated from the antenna element, a bandpass filter (BPF) that aligns with the intended receive frequency and serves to suppress reflected transmit signals and reverse signals, an adjustable-gain low-noise amplifier (LNA), and a receive-path phase shifter. The UTR module is specially designed for operation in phased array systems. The versatility and wideband agility of the UTR module allows a single phased array system to be designed that can be used for multiple purposes, such as, for example, both radar and communications applications.

22 Claims, 25 Drawing Sheets

Related U.S. Application Data continuation of application No. 14/748,221, filed on Jun. 23, 2015, now Pat. No. 10,686,487.

(51) Int. Cl.
*G01S 7/03* (2006.01)
*G01S 13/02* (2006.01)
*H01Q 3/24* (2006.01)

(52) U.S. Cl.
CPC ........ *H01Q 3/36* (2013.01); *G01S 2013/0245* (2013.01)

(58) Field of Classification Search
USPC .......................................................... 342/174
See application file for complete search history.

(56) References Cited

U.S. PATENT DOCUMENTS

| | | | | | |
|---|---|---|---|---|---|
| 5,027,125 | A * | 6/1991 | Tang | ........................ | H01Q 3/24 342/368 |
| 5,130,715 | A * | 7/1992 | Yanagisawa | ............ | G01S 13/66 342/158 |
| 5,745,076 | A * | 4/1998 | Turlington | ......... | H01Q 21/0087 342/372 |
| 7,505,604 | B2 * | 3/2009 | Zakrzewski | ......... | G06V 10/811 382/286 |
| 7,729,510 | B2 * | 6/2010 | Zakrzewski | ......... | G06F 18/253 340/630 |
| 7,982,664 | B1 * | 7/2011 | Uscinowicz | .......... | G01S 7/4004 342/174 |
| 8,218,476 | B2 * | 7/2012 | Miller | ................ | H04B 7/18541 370/321 |
| 8,400,502 | B2 * | 3/2013 | Zakrzewski | .......... | G06F 18/256 348/122 |
| 8,542,106 | B2 * | 9/2013 | Hilsebecher | .......... | G01S 17/931 340/436 |
| 8,605,947 | B2 * | 12/2013 | Zhang | .................... | G08G 1/167 348/148 |
| 8,730,102 | B2 * | 5/2014 | Richards | ................ | H01Q 3/267 342/368 |
| 9,124,361 | B2 * | 9/2015 | Puzella | .................. | H04B 17/21 |
| 9,155,097 | B2 * | 10/2015 | Li | ............................ | H01Q 3/30 |
| 9,271,293 | B2 * | 2/2016 | Sutskover | ............ | H04B 7/0682 |
| 9,537,605 | B1 * | 1/2017 | Actis | ........................ | H04K 3/42 |
| 9,569,003 | B2 * | 2/2017 | Rofougaran | ............ | G06F 3/017 |
| 9,614,279 | B2 * | 4/2017 | McDevitt | ................ | H01Q 3/267 |
| 9,848,391 | B2 * | 12/2017 | Jalali | ..................... | H01Q 1/246 |
| 9,882,279 | B2 * | 1/2018 | Bull | .................... | H04B 7/0617 |
| 9,977,122 | B2 * | 5/2018 | Pitts | ................... | H01Q 21/0006 |
| 10,027,354 | B2 * | 7/2018 | Cohen | ..................... | H04B 1/04 |
| 10,686,487 | B2 * | 6/2020 | Kirkpatrick | .............. | H04B 1/48 |
| 2003/0001771 | A1 * | 1/2003 | Ono | ....................... | G01S 13/931 342/72 |
| 2004/0019278 | A1 * | 1/2004 | Abend | ................. | G01S 7/52061 600/454 |
| 2004/0220474 | A1 * | 11/2004 | Abend | ................ | G01S 15/8993 600/437 |
| 2005/0069207 | A1 * | 3/2005 | Zakrzewski | ............ | G06V 20/52 382/218 |
| 2005/0099332 | A1 * | 5/2005 | Nakano | .................... | G01S 13/42 342/90 |
| 2006/0121869 | A1 * | 6/2006 | Natarajan | ................. | H01Q 3/22 455/276.1 |
| 2007/0152751 | A1 * | 7/2007 | Do | ........................... | H03F 3/265 330/165 |
| 2008/0019567 | A1 * | 1/2008 | Takagi | .................... | G06V 20/58 382/103 |
| 2008/0058019 | A1 * | 3/2008 | Natarajan | ................. | H01Q 3/42 455/562.1 |
| 2009/0016609 | A1 * | 1/2009 | Zakrzewski | ............ | G06V 20/52 382/190 |
| 2009/0040367 | A1 * | 2/2009 | Zakrzewski | ........... | G06F 18/256 348/E5.022 |
| 2009/0238258 | A1 * | 9/2009 | Sjoland | .................... | H03F 3/189 455/127.2 |
| 2009/0273517 | A1 * | 11/2009 | Thiesen | .................... | H01Q 21/065 342/372 |
| 2010/0052977 | A1 * | 3/2010 | Sathyendra | ............. | G01S 7/411 342/25 F |
| 2010/0097200 | A1 * | 4/2010 | Hilsebecher | ............ | G01S 7/412 702/77 |
| 2010/0104199 | A1 * | 4/2010 | Zhang | .................... | G06V 20/588 382/199 |
| 2010/0277233 | A1 * | 11/2010 | Robinson | .................. | H03F 3/54 327/581 |
| 2010/0321231 | A1 * | 12/2010 | Nakahama | .............. | G01S 7/062 342/159 |
| 2011/0221628 | A1 * | 9/2011 | Kamo | ...................... | G01S 7/295 342/123 |
| 2012/0140780 | A1 * | 6/2012 | Chang | ................ | H04B 7/18517 398/43 |
| 2013/0207834 | A1 * | 8/2013 | Mizutani | ................ | G01S 7/411 342/107 |
| 2014/0292554 | A1 * | 10/2014 | Smith | ...................... | G01S 7/411 342/146 |
| 2015/0362583 | A1 * | 12/2015 | Ainspan | ................... | G01S 7/024 342/361 |
| 2015/0372649 | A1 * | 12/2015 | Garrec | ....................... | H03F 3/72 330/295 |
| 2018/0164432 | A1 * | 6/2018 | Lal | ....................... | B81B 3/0021 |
| 2020/0133288 | A1 * | 4/2020 | Abari | ................... | G05D 1/0088 |

* cited by examiner

UNIVERSAL TRANSMIT/RECEIVE MODULE FOR RADAR AND COMMUNICATIONS

CROSS-REFERENCE TO RELATED APPLICATIONS

This application is a continuation of U.S. patent application Ser. No. 16/871,899, filed on May 11, 2020, which is a continuation of U.S. patent application Ser. No. 14/748,221, filed on Jun. 23, 2015.

BACKGROUND OF THE INVENTION

Phased arrays are used in a wide variety of applications. For example, radar phased arrays are used in military aircraft, naval ships, military satellites and drone systems to detect, jam, and for missile guiding purposes. Phased arrays are also used in a large variety of non-military applications including, for example, air and terrestrial traffic detection and control systems, radio broadcasting, earth-orbiting satellites, space probe communications, cellular systems, and weather research and forecasting systems. Unfortunately, a single multi-purpose phased array system that can be used for all of these different types of applications and which can be used for both radar and communications applications, in particular, is not currently available.

A phased array includes a number of spatially separated but proximate antenna elements. The number of antenna elements used depends on the application. In principle, a phased array can be made with as few as two antenna elements. However, the number that is used is usually much greater. For example, the FPS-85 radar system in Eglin, Fla. and operated by the United States Air Force has over 5,000 transmitter antenna elements and nearly 20,000 receive antenna elements.

FIG. 1 is a drawing showing the basic parts of a conventional phased array system 100. The phased array system 100 includes a plurality of transmit-receive (TR) modules, a plurality of associated antenna elements 104, and a beamformer 106. A high-frequency radio frequency (RF) source 108 is also provided, which directs low-power, RF signals into the transmit paths of the TR modules 102 during times the TR modules 102 are transmitting, and a receiver 110 for processing received RF signals.

The transmit path in each TR module 102 includes a linear (e.g., Class A, B, or AB) high-power amplifier (HPA) 112. The receive path in each TR module 102 includes a low-noise amplifier (LNA) 114. The antenna element 104 associated with each TR module 104 is used for both transmitting and receiving. When transmitting, low-power RF signals from the RF source 108 are directed through the beamformer 106 and amplified into high-power RF transmit signals by the HPAs 112. The high-power RF transmit signals from each TR module 102 are then directed to the antenna elements 104, which convert the high-power RF transmit signals into high power electromagnetic waves and radiate the high-power electromagnetic waves out over the air or into space where they are received by a remote target. When receiving, the antenna elements 104 of the phased array system 100 capture electromagnetic energy from incident electromagnetic waves and convert the captured electromagnetic energy into RF electrical signals. Because the electromagnetic energy captured by the antenna elements 104 is usually very weak, the received RF electrical signals must be amplified by the LNAs 114 before they can be further processed downstream. The LNAs 114 are designed for low noise figure and are incapable of handling high input powers. Accordingly, to protect the LNAs 114 from being damaged and prevent receiver desensitization, the received RF signals are first passed through limiters 116 before being directed into the inputs of the LNAs 114.

The antenna elements 104 in phased array transceiver systems are configured in close proximity so that that the RF power radiated by the antenna elements 104 during transmission can constructively interfere and combine to form a "beam," and so that the very weak signals impinging on the antenna array can be more readily detected. The beamformer 106 controls the phase relationships among the transmitted RF signals in the transmit paths of the TR modules 102 and, consequently, the direction of transmission (or "beam angle") of the transmitted beam. Depending on the application, the beamformer 106 is configured to establish a beam with a fixed beam angle or a beam angle that is variable or adaptive. In applications requiring a fixed beam angle, such as in a tower array or a geostationary satellite, the antenna array is aimed in the desired direction and the phase relationships among the transmitted RF signals in the transmit paths of the TR modules 102 are set and fixed to achieve the required fixed beam angle and then not adjusted thereafter. In applications requiring a variable or adaptive beam angle, such as in radar applications where a target may be moving, the phase relationships of the transmitted RF signals must be varied. To accomplish this, the beamformer 106 adjusts and controls the relative time delays or relative phase shifts of the transmitted RF signals. By individually adjusting and controlling the time delays or phase shifts, the transmit beam angle can be varied or, in other words, the transmit beam can be "steered." The beamformer 106 may be further configured to control the relative time delays or relative phase shifts of the received RF signals passing through the receive paths of the TR modules 102. Individually adjusting and controlling the time delays or phase shifts of the received signals allows the receive array pattern to be adjusted to a desired or required receive array pattern.

One serious and well-known problem associated with TR modules is that the RF power generated by the TR module's HPA can be reflected by the TR module's antenna element and back into the output of the HPA, instead of being fully radiated by the antenna element. The reflected transmit RF power is highly undesirable since it can alter the HPA's load impedance and contribute to intermodulation distortion. Transmitted power can also be undesirably reflected from the antenna element and into the receive path of the TR module, causing distortion of the RF signals being received by the TR module.

Another serious and well-known problem is that when the TR module 102 is configured in an array, along with other TR modules (as in FIG. 1), RF signals transmitted from an antenna element of one TR module can be undesirably intercepted by antenna elements of other TR modules in the array. These "reverse" signals are also highly undesirable since they can be passed into the intercepting modules' transmit and receive paths and cause further distortion in the transmitted and received signals.

In an effort to address these problems, circulators 118 are employed in the TR modules 102 of conventional phased array systems. As shown in FIG. 1, each of the TR modules 102 is equipped with its own circulator 118, and is a three-port device having a first port connected to the output of its associated TR module's HPA 112 (transmit path port), a second port connected to the TR module's antenna element 104 (antenna port), and a third port connected to the input of the receive path of the TR module 102 (receive path port). The directional properties of the circulator 118 are asymmetric (i.e., are non-reciprocal). This asymmetry is exploited and relied on in conventional TR module 102 to prevent reflected transmit signals and reverse signals from other TR modules from being directed back into the transmit path and into the output of the HPA 112. Specifically when the TR module is transmitting, its circulator 118 provides a low impedance path for signals directed from the circulator's transmit path port to its antenna port, thereby allowing transmitting to occur, but isolates the transmit port from the antenna port in the reverse direction, for example, by attenuating signals (such as reflected signals or reverse signals) flowing in the reverse direction.

Although the circulators 118 can be effective, they do not provide any protection for signals that are reflected into the receive path of the TR module and do not provide protection against reverse signals from other TR modules in the array from being directed into the receive path. Furthermore, the circulators 118 are effective at preventing transmit reflected signals and reverse signals into the transmit path only over a very narrow range of operating frequencies. This narrowband limitation is highlighted in FIGS. 2A and 2B, which are scattering parameter measurements taken on a typical circulator. FIG. 2A shows the forward transfer coefficient (scattering parameter (S-parameter) S21) of the circulator swept over a 900 MHz to 1 GHz frequency range. FIG. 2B shows the reverse transfer coefficient (S-parameter S12) of the circulator swept over the same frequency range. As can be seen in FIG. 2A, the forward transfer coefficient S21 remains flat and near 0 dB (~−0.27 dB) over the entire swept frequency range, indicating that for the forward direction, if the circulator was to serve as one of the circulators 118 in one of the TR modules 102 of the phased array system 100 in FIG. 1, it would be effective at delivering most of the power from port 1 (attached to transmit path port) to port 2 (attached to antenna port). However, FIG. 2B reveals that the reverse transfer coefficient S12 provides high isolation in the reverse direction only over a very narrow isolation band of ~30 MHz. The very narrow isolation band means that if the circulator was to serve as one of the circulators 118 in one of the TR modules 102 of the phased array system 100 in FIG. 1, transmitted RF signals outside the isolation band would be susceptible to being reflected by the TR module's antenna element 104 back into the transmit path of the TR module 102.

Circulators must be used in conventional phased array systems in order to prevent transmit signals and reverse signals from reflecting back into the transmit paths of the TR modules 102. However, the presence of the circulators 118 and their narrowband limitations precludes the conventional phased array system 100 from being used in any application except for the specific application for which it is designed. In other words, conventional phased array systems are not multi-purpose and cannot be used for multiple applications, such as for both radar and communications applications, for example.

In addition to the narrowband restrictions imposed by the circulators 118, the circulator 118 does not do anything to prevent reflected transmit signals from being directed into the receive path of a TR module 102, and does not do anything to prevent reverse signals from other TR modules 102 from being directed into TR module's receive path. The receive signals are therefore susceptible to being distorted by transmit reflected signals and reverse signals from other TR modules.

Other drawbacks associated with circulators are that they are large passive devices that have insertion losses, consume power, occupy large areas of the printed circuit board (PCB) on which they and the other components of the TR modules 102 are formed, and contribute to the overall weight and size of the phased array system 100. As can be seen in FIG. 3, which is a photograph of a typical conventional TR module 300, the circulator 304 and associated PCB waveguide traces occupy nearly a third of the area of the PCB 302. Moreover, because the HPA 112 of the TR modules 102 is a linear amplifier, it is large in size and very inefficient. Due to its inefficiency, a very large heatsink 306 (see FIG. 3) is required to conduct heat away from the HPA 112 and to protect the HPA 112 from being damaged, and a larger power supply than desired is necessary to compensate for the HPA's inefficiency. The large circulator 304 and large heatsink 306 also add to the cost, size and weight of the TR module 102. Because phased array systems will often include hundreds and sometimes thousands of TR modules 102, the incremental cost, size and weight of each TR module 102 must be multiplied by hundreds or thousands of times in determining the overall cost, size and weight of the entire system. Furthermore, with hundreds and possibly thousands of very inefficient HPAs 112, large and heavy power supplies are required to compensate for the multiple inefficiencies and very large and heavy cooling systems are necessary to displace the enormous amount of heat generated by the hundreds and possibly thousands of HPAs 112.

BRIEF SUMMARY OF THE INVENTION

Transmit-receive (TR) modules for radar and communications phased array systems and methods are disclosed. An exemplary TR module includes a transmit path, a receive path, and an antenna element that is shared by the transmit path and receive path. The transmit path includes a transmit-path phase shifter, a driver, a switch-mode power amplifier (SMPA), and a dynamic power supply (DPS) that generates a DPS voltage. The receive path includes a transmit/receive (TX/RX) switch, a bandpass filter (BPF), an adjustable-gain low-noise amplifier (LNA), and a receive-path phase shifter When configured in a phased array, the transmit-path phase shifters in the UTR modules of the array individually introduce unique phase shifts in a plurality of low-power RF transmit signals that are being directed along their associated transmit paths. The phase shifts introduced by the transmit-path phase shifters collectively determine the direction of transmission of the final high-power transmit beam that is ultimately produced by the array. The transmit-path phase shifters can also be dynamically adjusted, thereby allowing the beam to be steered. The drivers in the UTR modules drive the RF input ports of their SMPAs, according to the phase-shifted low-power RF transmit signals, and while the DPS voltages are applied to the power supply ports of the SMPAs. The SMPAs are switched ON and OFF by the driver, between compressed and cut-off states. The DPS voltages are used to set and control the RF output powers of the SMPAs. They can also be independently controlled, in order to affect the aperture profile of the final transmit beam. Depending on the application, the DPS voltages may be further varied to control the signal envelope of the high-power RF signals produced by the SMPAs. Finally, the antenna elements of the UTR modules transduce the high-power RF signals produced by the SMPAs into high-power RF electromagnetic waves and radiate the resulting high-power RF electromagnetic waves into the air or space, where they interfere and combine to form the desired high-power transmit beam, which depending on the application (for example, radar or communications), is directed toward a remote target or remote receiver. In applications in which the location of the target or remote receiver is unknown, the UTR modules can be physically arranged (e.g., spherically or in some other multi-dimensional spatial configuration) and/or the transmit beam direction can be electronically controlled to produce a transmit beam that is omni-directional, quasi-omni-directional, isotropic, or quasi-isotropic, thereby allowing the array beam to be radiated omni-directionally, quasi-omni-directionally, isotropically, or quasi-isotropically and the transmitted beam to therefore arrive at the target or remote receiver despite the location of the target or remote receiver being unknown.

When the phased array system is receiving, RF electromagnetic waves incident on the antenna elements of the array (for example, RF electromagnetic radar pulses that arriving after being reflected from a remote target (radar application) or RF electromagnetic communications waves arriving from a remote transmitter (communications application)) are transduced by the antenna elements, thereby forming a plurality of low-power RF receive signals. The low-power RF receive signals are directed into the receive paths of the UTR modules and introduced to the BPFs. The BPFs are tuned (either beforehand or dynamically) to the intended frequency of the low-power RF receive signals. Each BPF also serves to suppress any transmit RF signals that may be reflected into the receive path and any unwanted reverse signals that may be intercepted by the antenna element from other UTR modules, thereby protecting the low-power RF receive signals from being distorted. The filtered low-power RF receive signals are then amplified by their adjustable-gain LNAs and phase-shifted by the receive-path phase shifters if desired or needed to adjust the receive array pattern, and downconverted (and demodulated, if need be) to baseband signals. Finally, the baseband signals are combined to form the desired receive signal.

Further features and advantages of the invention, including a detailed description of the above-summarized and other exemplary embodiments of the invention, will now be described in detail with respect to the accompanying drawings, in which like reference numbers are used to indicate identical or functionally similar elements.

DETAILED DESCRIPTION

Figure 4:
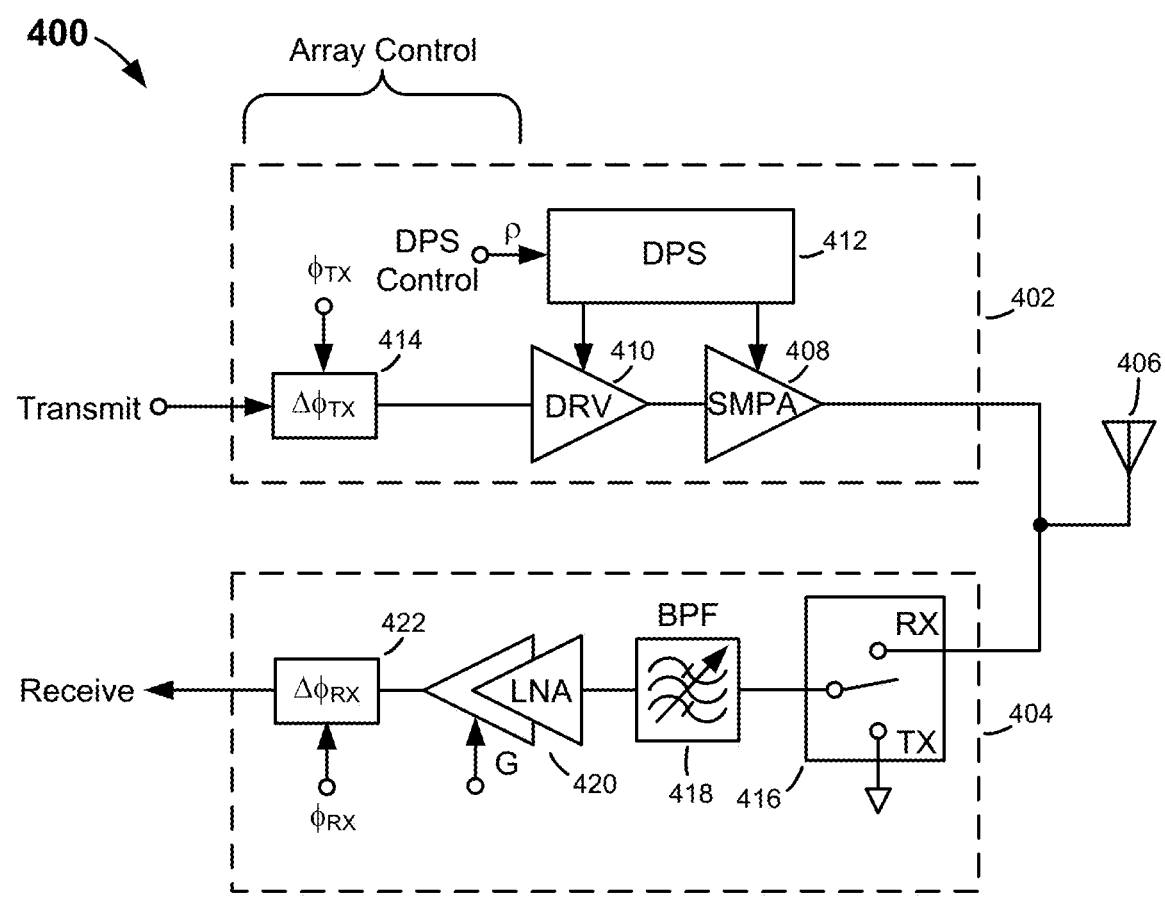
FIG. 4 is a drawing of a universal transmit-receive (UTR) module, according to an embodiment of the present invention, highlighting the UTR module's salient components.

Referring to FIG. 4, there is shown a transmit-receive (TR) module 400 for use in phased array systems, including radar phased array systems and communications phased array systems. By virtue of its versatility, wideband agility, and multi-purpose capabilities, the TR module 400 is referred to in the detailed description that follows as a "universal TR module" or "UTR module."

The UTR module 400 includes a transmit path 402, a receive path 404, and an antenna element 406 that is shared by the transmit and receive paths 404 and 406. The transmit path 402 includes a power amplifier (PA), preferably a switch-mode power amplifier (SMPA) 408, having an output that is directly coupled (direct connection or via an AC coupling capacitor) to the antenna element 406, for example, via a low-loss (e.g., 50 Ω) path; a driver 410 that is configured to drive the SMPA 408; a dynamic power supply (DPS) 412 and a transmit-path phase shifter 414 (or adjustable time delay device). The receive path 404 includes a transmit/receive (TX/RX) switch 416, a tunable band-pass filter (BPF) 418, a low-noise amplifier (LNA) 420, and a receive-path phase shifter 422 (or adjustable time delay device). Each of the various elements of the UTR module 400 is discussed in further detail below.

The transmit-path shifter 414 is used to introduce a phase shift in the RF signal transmitted through the transmit path 402 of the UTR module 400. Similarly, the receive-path phase shifter 422 is used to introduce a phase shift in the RF signal transmitted through the receive path 404. The transmit-path and receive-path phase shifter 414 and 422 may be implemented as either fixed or adjustable phase shifters, but are preferably made to be adjustable, so that the UTR module 400 can be used in electronically scanned phased array systems. They may also be active or passive, and digital or analog. For example, in one embodiment of invention, the transmit-path and receive-path phase shifters 414 and 422 are active phase devices implemented in a single or separate monolithic microwave integrated circuit (MMIC) that is/are made from gallium arsenide GaAs field-effect transistors (GaAs-FETs) or gallium nitride FETs (GaN-FETs) and mounted on a printed circuit board (PCB), along with the other components of the UTR module 400. In another embodiment of the invention, the transmit-path and receive-path phase shifters 414 and 422 are passive devices such as, for example, micromechanical (MEM) devices or other passive devices having capacitors and/or inductors which may be, though not necessarily, etched into one or more conducting layers of the UTR module's PCB.

Figure 5:
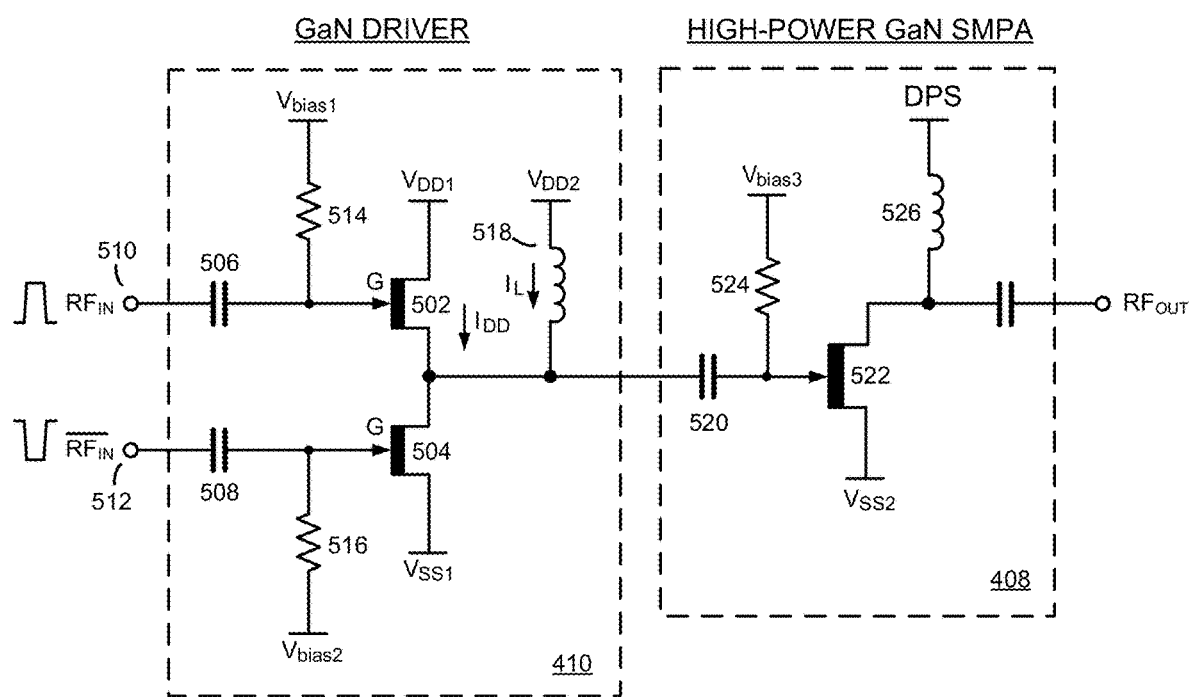
FIG. 5 is a schematic diagram of an exemplary gallium-nitride based (GaN-based) driver and GaN-based switch-mode power amplifier (SMPA), which can be used to implement the SMPA in the UTR module in FIG. 4, in accordance with one embodiment of the present invention.

The SMPA 408 and driver 410 in the transmit path 402 of the UTR module 400 may also be implemented in various ways. FIG. 5 shows an exemplary gallium-nitride (GaN)-based driver 410 and GaN-based SMPA 408, which may be used or adapted for use in UTR module 400. The GaN-based SMPA 408 and GaN-based driver 410 are preferably designed and manufactured in an integrated circuit (IC) chip using GaN high electron mobility transistors (GaN-HEMTs). However, other solid-state switching devices made of the same or other types of semiconducting materials may be alternatively used, as will be appreciated by those of ordinary skill in the art. The GaN-based driver 410 includes first and second GaN-HEMTs 502 and 504. The drain of the first GaN-HEMT 502 is connected to a drain supply voltage VDD1, and the source of the second GaN-HEMT 504 is connected to a more negative source supply voltage VSS1. AC coupling capacitors 506 and 508 are coupled between the gates of the first and second GaN-HEMTs 502 and 504 and first and second input terminals 510 and 512. The first and second input terminals 510 and 512 are configured to receive first and second RF input signals RFin and $\overline{\text{RFin}}$, which are 180 degrees out of phase First and second DC bias resistors 514 and 516 are also connected to the gates of the first and second GaN-HEMTs 502 and 504, and serve to set the DC operating points of the first and second GaN-HEMTs 502 and 504. Finally, an inductor 518 is connected between a second drain supply voltage VDD2 and the output of the driver 410. It should be noted that whereas the inductor 518 is shown to be configured to receive a first supply voltage VDD1 different from the second supply voltage VDD2 applied to the drain of the first GaN-HEMT 502, the inductor 518 and first GaN-HEMT 502 can be alternatively configured to share the same power supply. Additionally, the first GaN-HEMT 502 (and possibly the inductor 518) and high-power GaN-HEMT 522 in the GaN-based SMPA 408 can be configured to share the DPS voltage generated and provided by the DPS 412, as illustrated in FIG. 4.

The output of the GaN-based driver 410 is coupled to the input of the GaN-based SMPA 408, via an AC coupling capacitor 520. The GaN-based SMPA 408 includes a high-power n-channel depletion mode GaN-HEMT 522, which is configured to operate as a switch and generate high RF power for the UTR module's 400 antenna element 406. A DC bias resistor 524 is connected to the gate of the high-power GaN-HEMT 522, and serves to set the DC operating point of the high-power GaN-HEMT 522. Finally, an inductor 526, which receives the DPS voltage from the DPS 412, is connected to the drain of the high-power GaN-HEMT 522.

During operation, when the first GaN-HEMT 502 is turned on and the second GaN-HEMT 504 is turned off, the first GaN-HEMT 502 pulls the gate of the high-power GaN-HEMT 522 in the GaN-based SMPA 408 up to the drain supply voltage VDD1, causing the high-power GaN-HEMT 522 to switch on. As the high-power GaN-HEMT 502 is being turned on, the inductor 518 in the GaN-based driver 410 serves as a current source that supplies a current $I_L$. The inductor current $I_L$ combines with the current $I_{DD}$ being supplied through the first GaN-HEMT 502, thereby enhancing the current flow into the gate of the high-power GaN-HEMT 522 to shorten the turn on time of the high-power GaN-HEMT 522. Enhancing current flow in this way allows the GaN-based SMPA 408 to operate at very high RF frequencies. Conversely, when the first GaN-HEMT 502 is turned off and the second GaN-HEMT 504 is turned on, the gate of the high-power GaN-HEMT 522 is pulled down to the source supply voltage VSS1 applied to the source of the second GaN-HEMT 504, causing the high-power GaN-HEMT 522 in the GaN-based SMPA 408 to switch off. Because the high-power GaN-HEMT 522 dissipates power only during the times it is being switched, the GaN based SMPA 408 is very energy efficient. Efficiency is further enhanced by powering the GaN-based SMPA 408 using the DPS voltage provided by the DPS 412. Further details of the GaN-based SMPA 408 and GaN-based driver 410 may be found in commonly owned and assigned U.S. patent application Ser. No. 14/743,046, entitled "*Current Enhanced Driver for High-Power Solid-State Radio Frequency Power Amplifiers,*" which is incorporated herein by reference. Commonly owned and assigned U.S. patent application Ser.

No. 14/447,452, entitled *"Limiting Driver for Switch-Mode Power Amplifier,"* also discloses a driver, SMPA and signal conditioning circuitry that may be used to implement, modify or supplement the GaN-based SMPA 408 and GaN-based driver 410. That application is also incorporated herein by reference.

The DPS 412 in the transmit path 402 of the UTR module 400 is configured to produce a DPS voltage that depends on a DPS control signal applied to the control terminal ρ of the DPS 412. As will be discussed in further detail below, the UTR module 400 may be used in a phased array system that can be used for both radar and communications, either alternately or simultaneously. Accordingly, depending on the application, in addition to controlling the RF output power produced by the SMPA 408, the DPS control signal may be also used to set and control envelope variations (information-bearing or non-information-bearing) in the high-power, high-frequency RF signal transmitted by the UTR modules 400. In radar applications the DPS control signal can also be used to affect the aperture profile of the transmitted radar beam. In some applications the location of the target or remote receiver may be unknown. In those applications the UTR modules 400 making up the phased array system can be physically arranged (e.g., spherically or in some other multi-dimensional spatial configuration) and/or the transmit beam direction can be electronically controlled to produce a transmit beam that is omni-directional, quasi-omni-directional, isotropic, or quasi-isotropic, thereby allowing the array beam to be radiated omni-directionally, quasi-omni-directionally, isotropically, or quasi-isotropically and the transmitted beam to therefore arrive at the target or remote receiver despite the location of the target or remote receiver being unknown.

Figure 6:
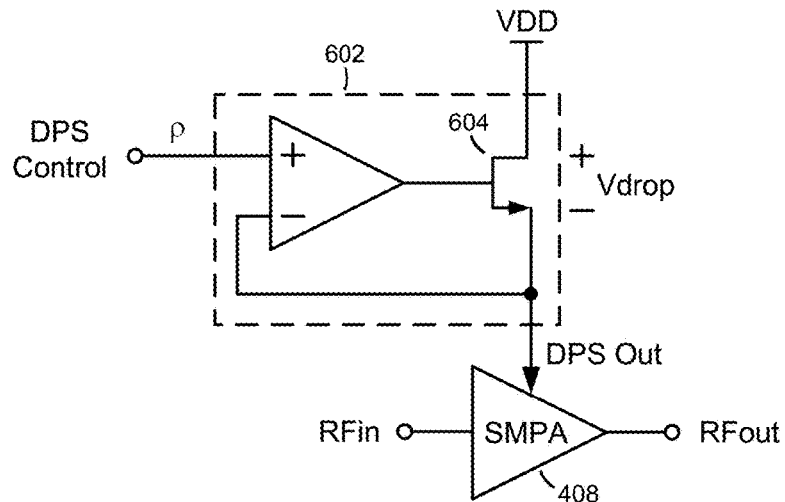
FIG. 6 is a simplified schematic diagram of a linear-regulator-based dynamic power supply (DPS), which can be used or modified to implement the DPS in the transmit path of the UTR module in FIG. 4, in accordance with one embodiment of the invention.

The DPS 412 can be, but is not necessarily, fabricated in the same IC chip as the driver 410 and SMPA 408. It can also be designed in various ways. FIG. 6 illustrates, for example, how the DPS 412 can be designed based on a linear voltage regulator 602. According to this approach, the linear regulator 602 controls the on resistance of a field-effect transistor (FET) 604 based on the DPS control signal applied to the control input ρ of the linear regulator 602. Because power loss according to this approach is directly proportional to the voltage drop Vdrop across the FET 604, this approach to implementing the DPS 412 may not be the most attractive approach. Nevertheless, if efficiency is not a concern, the linear voltage regulator approach can provide a simple, low-cost solution.

Figure 7:
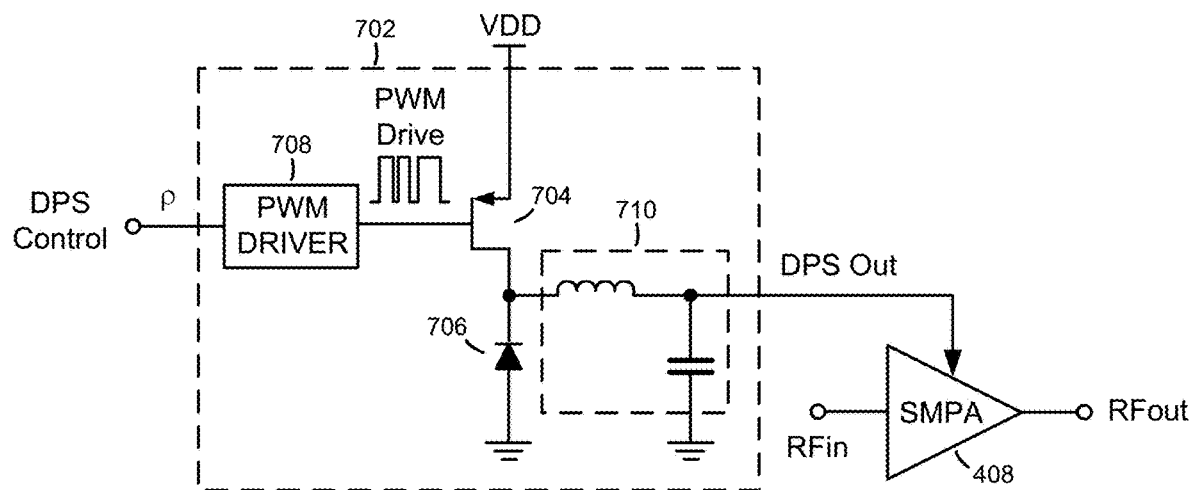
FIG. 7 is a simplified schematic diagram of a switch-based Class-S modulator, which can be used or modified to implement the DPS in the transmit path of the UTR module in FIG. 4, in accordance with one embodiment of the invention.

In most phased array applications efficiency is a primary concern, however. Therefore, to maximize efficiency, the DPS 412 is preferably designed using some type of switch-based modulator. FIG. 7 is a drawing illustrating how the DPS 412 can be constructed using a Class-S modulator 702. According to this approach, a transistor 704 and diode 706 are configured as a two-pole switch, which is controlled by a pulse-width modulation (PWM) driver 708. The widths of the pulses in the PWM drive signal provided by the PWM driver 708 are varied to control the on/off status of the switching transistor 704, in accordance with the DPS control signal applied to the control input ρ. The output LC filter 710 filters the output of the two-pole switch to recover the desired DSP supply voltage, as directed by the DPS control signal. The Class-S modulator 702 is substantially more efficient than the linear regulator approach in FIG. 6. Accordingly, it 702 or some other type of switch-based modulator is preferably used to implement the DPS 412.

The TX/RX switch 416 in the receive path 404 of the UTR module 400 operates depending on the application, and its control and operation are described in further detail below.

The BPF 418 serves to filter the RF signal received by the antenna element 406 and is preferably, though not necessarily, tunable, so that BPF 418 can be tuned to the intended RX frequency band. It should be mentioned that, although only a single BPF 418 is shown to be present in the exemplary UTR module 400 in FIG. 4, it is possible to include several BPFs having different bandpass characteristics and/or tuning capabilities in the UTR module 400.

Finally, the LNA 420, which preferably has an adjustable gain G, serves to amplify the BPF-filtered signal produced at the output of the BPF 418.

Figure 8:
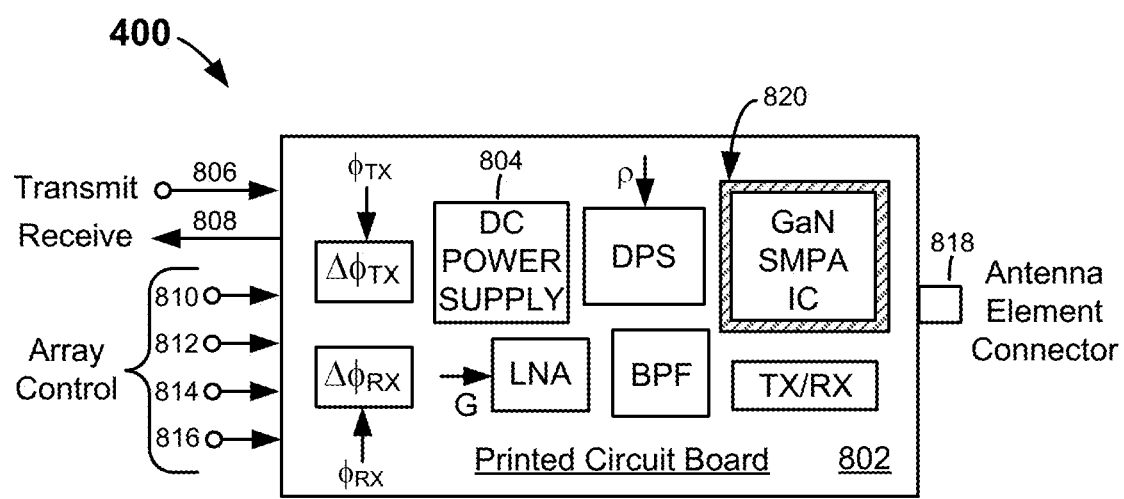
FIG. 8 is a drawing of the UTR module 400 in FIG. 4, provided to illustrate that in a preferred embodiment of the invention, the various components of the UTR module in FIG. 4 are mounted on a printed circuit board (PCB)

The various components of the UTR module 400 are preferably mounted on a PCB 802, as illustrated in FIG. 8. The PCB 802 includes, in addition to the transmit and receive path components, conducting traces (not shown) on either or both sides of the PCB 802 or, alternatively, in various conducting layers laminated in the PCB 802. The conducting traces provide the electrical connections that electrically connect the various components of the UTR module 400 to one another. To support high frequency applications, some or all of the conducting traces may be implemented as microstrip or stripline transmission lines, which serve as high-frequency waveguides. Note that the various components of the UTR module 400 need not be arranged in the positions shown in the FIG. 8, and are not drawn to scale. The drawing is provided to merely emphasize that in a preferred embodiment of the invention the various components of the UTR module 400 are mounted, in some way, on a PCB 802. In addition to the components of the UTR module 400 shown in FIG. 4, one or more DC power supply chips 804 may be mounted on the PCB 802 to supply DC power to the UTR module components. Alternatively or additionally, one or more alternative or additional external DC power supplies can be used to supply DC power to the components on the PCB 802 that require DC power. The PCB 802 further includes input/output (I/O) terminals 806 and 808 for inputting/outputting the RF transmit and receive signals, which depending on the application, may or may not be modulated with information. The array control terminals include first and second phase-adjust input terminals 810 and 812 that are configured to receive transmit-path and receive-path phase shift control signals $\phi_{TX}$ and $\phi_{RX}$ for setting and controlling the phase shifts $\Delta\phi_{TX}$ and $\Delta\phi_{RX}$ of the transmit-path and receive-path phase shifters 414 and 422, a gain input terminal 814 configured to receive a gain control signal that sets and controls the gain G of the LNA 420, and a DPS control terminal 816 that is configured to receive the DPS control signal for the control input ρ of the DPS 412. The PCB 802 may further include an antenna element connector port 818 for receiving the UTR module's antenna element 406. Alternatively, the antenna element 406 can be permanently attached to the PCB 802 or formed on or as part of the PCB 802 itself.

Figure 1:
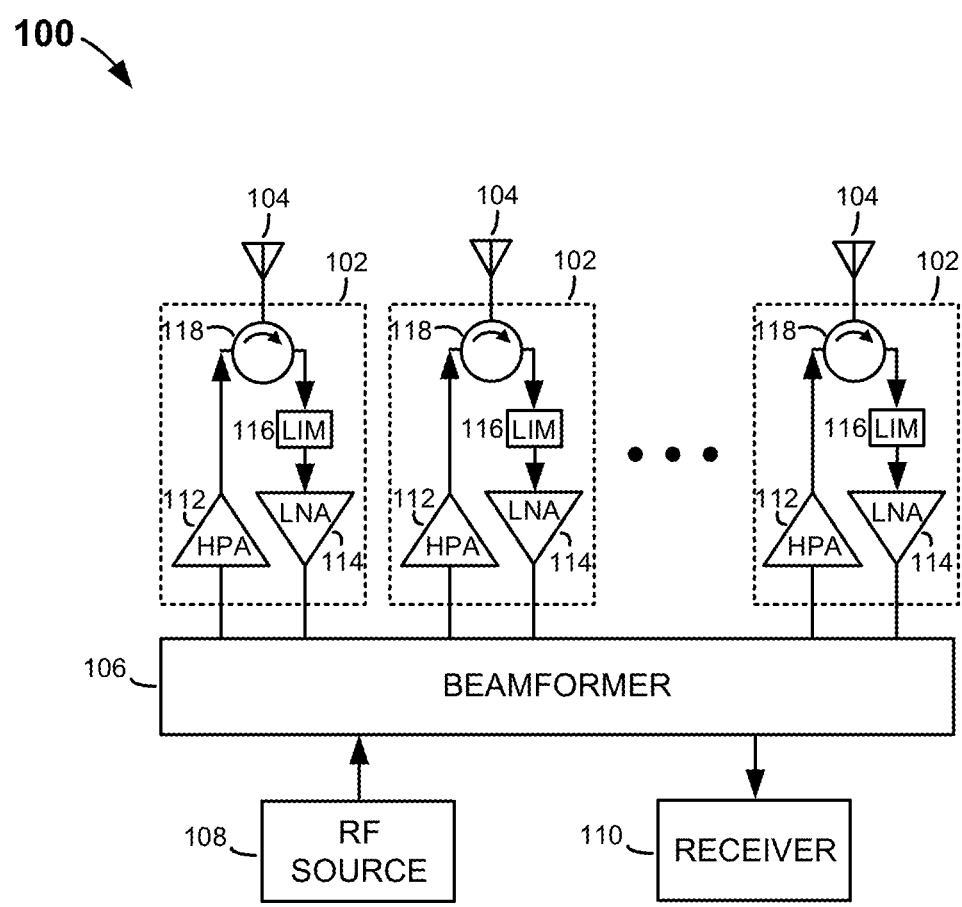
FIG. 1 is a drawing showing the basic parts of a conventional phased array system.
Figure 2A:
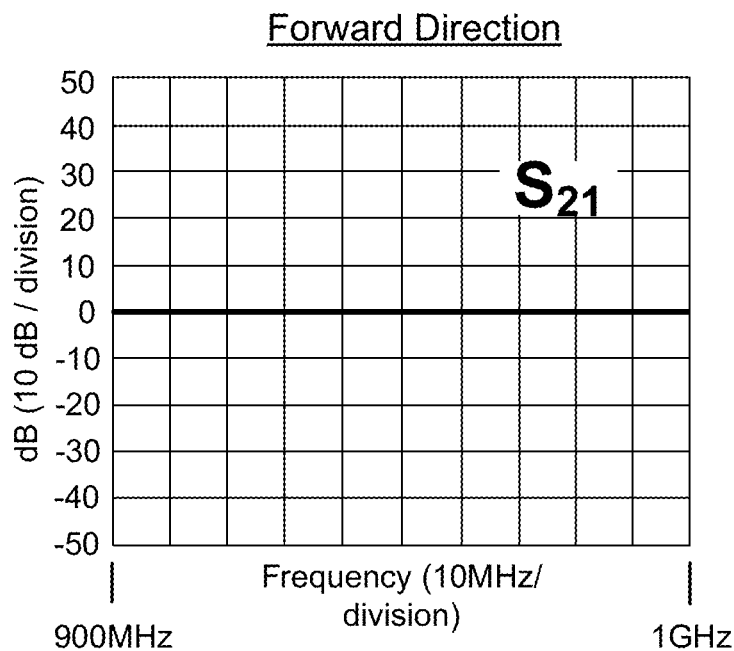
FIGS. 2A and 2B are screen shot measurements of the forward transfer coefficient S21 of a typical circulator (FIG. 2A) used in conventional transmit-receive (TR) modules and the reverse transfer coefficient S12 of the same circulator.
Figure 2B:
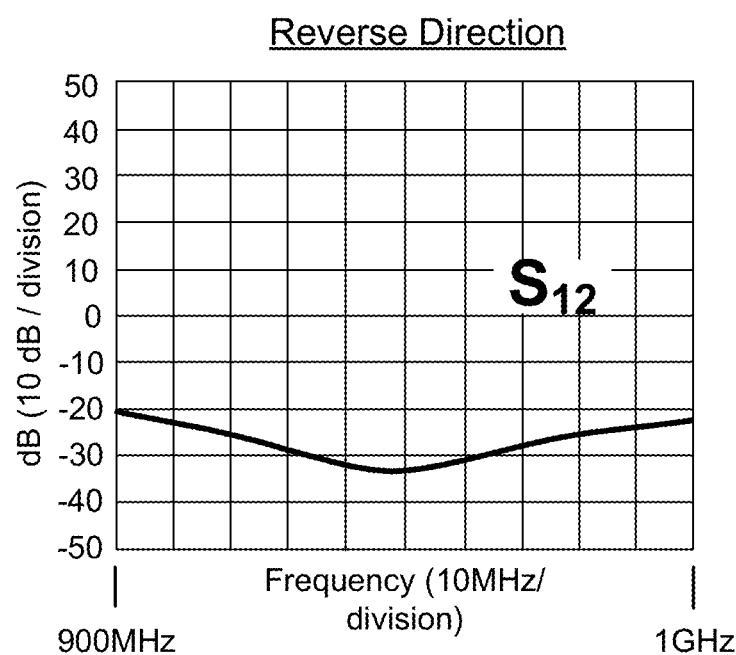
Figure 3:
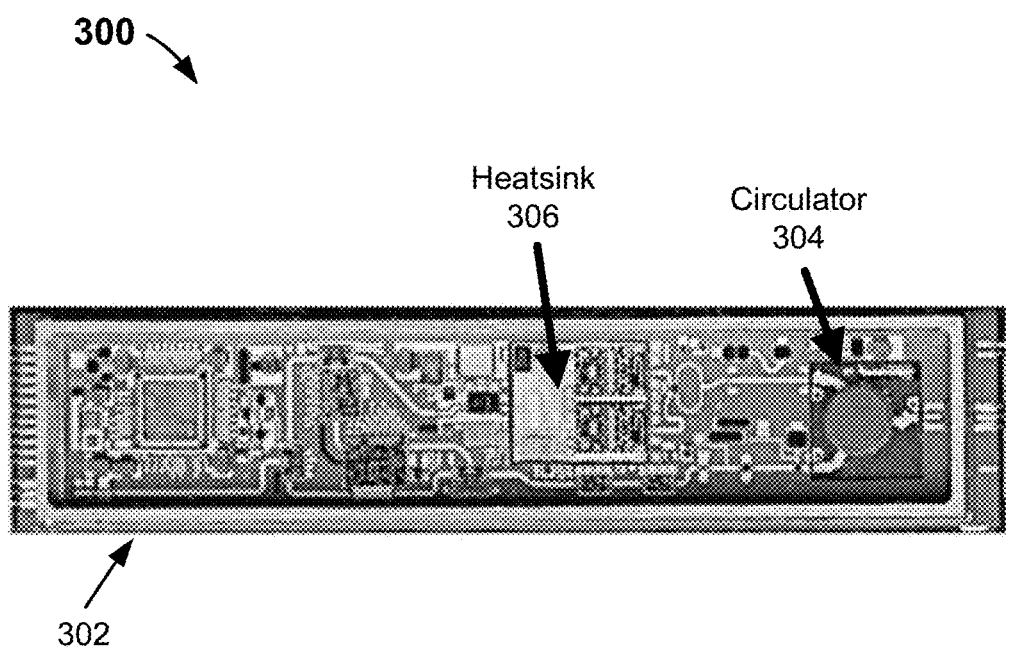
FIG. 3 is a reproduction of a photographic of a TR module commonly used in conventional phased array systems.

One significant advantage of the UTR module 400 over conventional TR modules (such as the conventional TR modules 102 described in FIG. 1 above) is that the UTR module 400 does not require a circulator. In fact, the output of the transmit path (i.e., the output of the SMPA 408) can be configured to remain directly coupled (e.g., by direct physical connection or via an AC coupling capacitor) to its respective antenna element 406 at all times. A circulator is unnecessary, even for wideband operations, due to the unique design and configuration of the UTR module 400.

Figure 9:
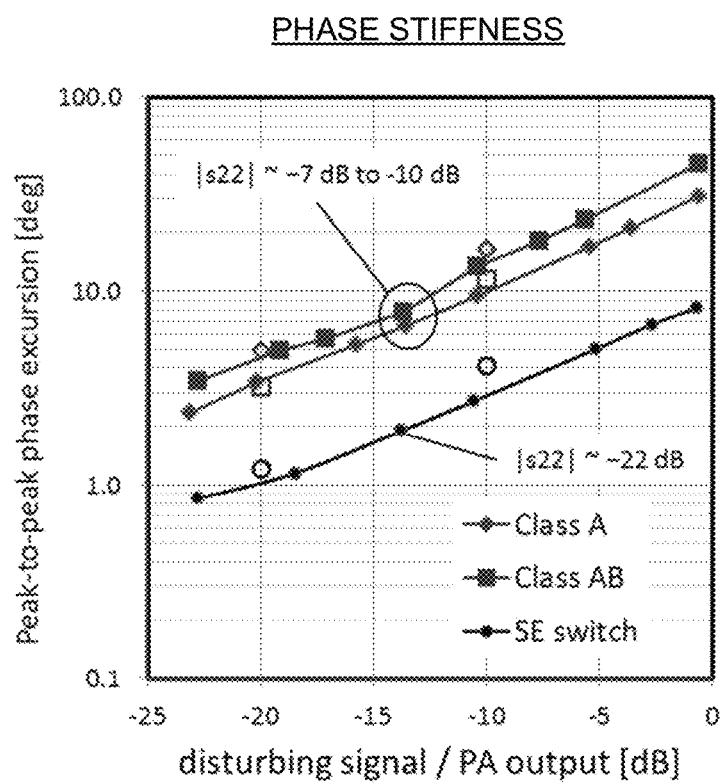
FIG. 9 is a graph showing the phase stiffness characteristics of the SMPA of the UTR module in FIG. 4, highlighting the SMPA's superior phase stiffness characteristics.

Among other characteristics, the presence and configuration of the SMPA 408, the configuration and operation of the TX/RX switch 416, and the tunability of the BPF 418 all contribute to the versatility and wideband capability of the UTR module 400. Unlike the linear HPAs 112 used in conventional TR modules, the SMPA 408 in the UTR module 400 is "phase stiff," meaning that it is significantly better at tolerating reverse and reflected signals than are linear HPAs. FIG. 9 is a graph that highlights this phase stiffness superiority of the SMPA 408 over two types of linear HPAs often used in conventional TR modules: a Class-A HPA and a Class-AB HPA. The measurements in the graph compare the absolute value of the output-reflection coefficient (i.e., S-parameter |S22|) of the Class-A and Class-AB HPAs compared to |S22| of a single-ended (SE) SMPA (like the SE GaN-based SMPA 408 in FIG. 5), when a disturbing signal (e.g., a reflected or reverse signal) is directed into the outputs of the various PAs. The Class-A and Class-AB HPAs are seen to be 7 to 10 dB less tolerant to the disturbing signal over the entire range of applied disturbing signal strengths (−25 dB to 0 dB). In other words, the SMPA is about 80% less sensitive to reverse signals than are the Class-A and Class-AB HPAs. Due to the superior phase stiffness of the SMPA 408, the SMPA 408 is able to tolerate any reflected or reverse signals that may be directed into the output of the SMPA 408 and produce a transmit signal that has not been distorted by the reflected and reverse signals.

The need for a circulator to isolate the receive path 404 is also eliminated by virtue of the presence of the TX/RX switch 416 and the BPF 418 in the receive path 416. In one embodiment of the invention the BPF 418 is tunable, thus allowing it to be tuned to align with the RX signal frequency. The filter skirts of the tuned BPF 418 suppress any TX signals that might be reflected from the antenna element 406 and any reverse signals that may be intercepted by the antenna element 406 from other UTR modules, thereby preventing the reflected and reverse signals from being directed into the LNA 420 while still allowing the desired RX signal to pass through to the LNA 420.

Figure 10:
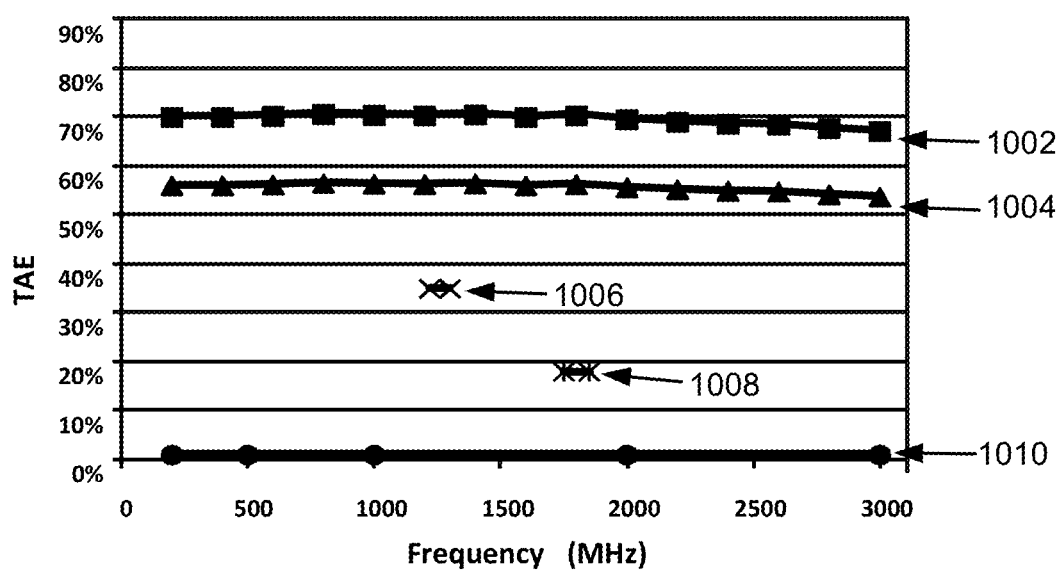
FIG. 10 is graph showing the total amplifier efficiency (TAE) of the SMPA of the UTR module in FIG. 4, the TAE of the entire transmitter of the UTR module in FIG. 4, and the TAE of the transmitters used in three different prior art TR modules that employ linear HPAs.

Another very important advantage of the UTR module 400 over conventional TR modules is that the UTR module 400 is extremely energy efficient. The energy efficiency of an electrical system provides an indication of how effective the system is at converting electrical power supplied to it into useful power. Power that is not used is undesirably dissipated as heat. FIG. 10 is a graph showing the total amplifier efficiency (TAE) (TAE (%)=100×Pout/(Pin+Pdc)) of the SMPA 408 by itself (arrow labeled "1002") and the TAE of the entire transmit path 402 of the UTR module 400 (arrow labeled "1004") over a frequency range of about 200 MHz to about 3 GHz, where Pdc is the DC power supplied, Pin is the RF input power, and Pout is the RF output power (i.e., useful power) produced at the output of the SMPA 408. The TAE of the SMPA 408 by itself (arrow 1002) is seen to be very high (about 70%) and over the entire 200 MHz to 3 GHz frequency range. The TAE of the entire transmit path 402 is, of course, lower than the TAE of the SMPA 408 by itself, but is also very high and approximately 55% over the entire 200 MHz-3 GHz frequency range.

FIG. 10 also includes the TAE performance of transmitters employed in three different prior art TR modules (indicated by the arrows labeled "1006", "1008" and "1010"). The TAE of the transmitters in all three prior art modules is seen to be substantially lower than both the TAE of the SMPA 408 by itself (arrow 1002) and the TAE of the entire transmit path 402 of the UTR module 400 (arrow 1004). In particular, the TAE of the transmitter of the first prior art TR module (arrow 1006) is only about 35%; the TAE of the transmitter of the second prior art TR module (arrow 1008) is less than 20%; and the TAE of the transmitter of the third TR module (arrow 1010) is less than 2%. The low TAEs of the transmitters in the first, second, and third prior art TR modules is due primarily to the fact that they employ linear HPAs in their transmitters.

The graph in FIG. 10 also highlights that the first and second prior art TR modules (arrows 1006 and 1008) are capable of operating only very narrow frequency ranges. This narrowband restriction is due to the presence of the circulators employed in those two TR modules. In contrast, the SMPA 408 (and, correspondingly, the UTR module 400 of the present invention overall) is seen to operate efficiently over a wide band of frequencies, even exhibiting over a decade bandwidth capability (i.e., fmax/fmin≈200 MHz/3 GHz>10). The third TR module (arrow 1010) does not employ a circulator, and is seen to be capable of operating over a wide frequency range. However, because it too employs a linear HPA in its transmitter and has a TAE of less than 2%, it is unsuitable for most purposes and especially unsuitable for use in phased array systems in which very high RF output powers must be produced.

Figure 11:
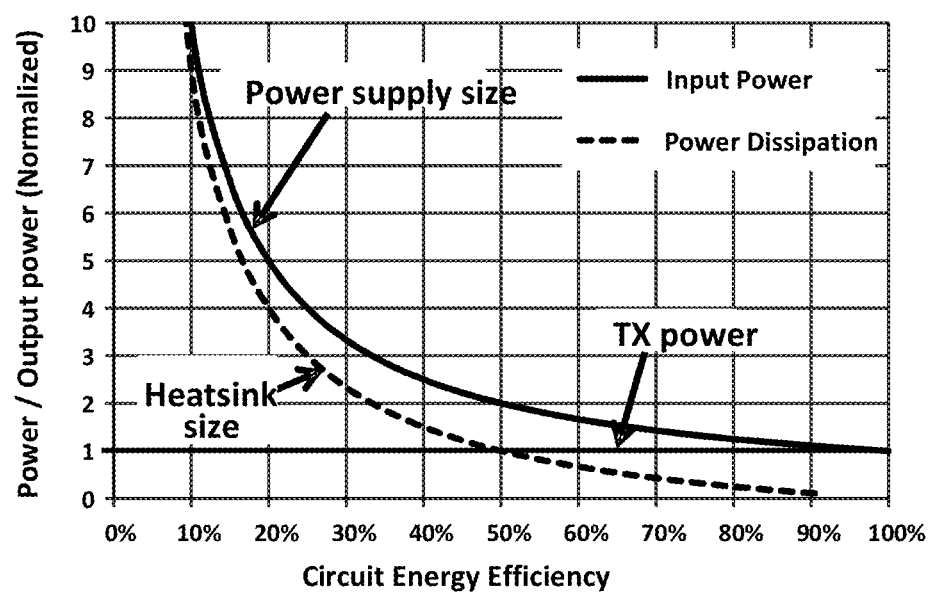
FIG. 11 is a graph showing the required power supply size and heatsink size for a high-power power amplifier when configured in a TR module versus the efficiency of the high-power power amplifier (horizontal axis) and normalized power (vertical axis)

The superior efficiency the SMPA 408 also allows a much smaller heatsink 820 (see FIG. 8) to be used, compared to the size of the heatsink that is required for a linear HPA producing the same useable RF output power. FIG. 11 is a graph showing the power supply size and heatsink size required for a high-power PA configured in a TR module versus the efficiency of the high-power PA (horizontal axis) and normalized power (vertical axis). At the point where the heatsink size curve intersects the 50% efficiency and unity normalized power crossing, the heatsink of that size absorbs the same amount of power as is delivered to the TR module's antenna element. However, when the high-power PA is less than 30% efficient, it is seen that the heatsink must be of a size that is capable of absorbing more than double the power delivered to the antenna element, and the power supply size must be at least twice as large as that which can be used when the high-power PA is 50% efficient. Considering the superior efficiency of the SMPA 408 in the UTR module 400 compared to the relative inefficiencies of the linear HPAs used in prior art TR modules (see, for example, FIG. 10 above), the heatsink size required for the SMPA 408 can be between ⅓ to ½ the size of the heatsink that would be required for a linear HPA producing the same useable RF output power.

Eliminating the need for a circulator and employing an SMPA 408 in the UTR module 400 allows a phased array system to be constructed that has a substantially better SWaP (size, weight and power) performance than can be possibly realized in phased array systems employing conventional TR modules. Phased array systems will often employ hundreds and sometimes thousands of TR modules. Accordingly, the SWaP performance of each TR module is a major factor in determining the SWaP performance of the phased array system as a whole. Since the UTR module 400 of the present invention can operate effectively, over wide frequency ranges and without using a circulator, and can use a much smaller heatsink for the SMPA 408, the UTR module 400 can be made much smaller and much lighter than conventional TR modules. The wideband agility of the UTR module 400 can be further enhanced, and the size and weight of the UTR module 400 can be further reduced, by implementing the SMPA 408 and driver 410 as a GaN-based IC (for example, as explained above in reference to FIG. 5). GaN has a high power density, thus allowing the GaN-based driver 410 and GaN-based SMPA 408 (see FIG. 5) to be fabricated in a compact IC and to be packaged in a small form factor. Loading of electrical power delivery systems is also significantly reduced when the UTR modules 400 are used in phased arrays, since the energy needed to power the phased array is substantially less than required by conventional phased array systems employing conventional TR modules. Finally, the superior efficiency of the UTR modules 400 allows much smaller and lighter power supplies to be used to power the phased arrays and minimizes the size and weight of fans and other cooling systems that may be needed to displace the heat generated by the UTR modules 400.

Figure 12:
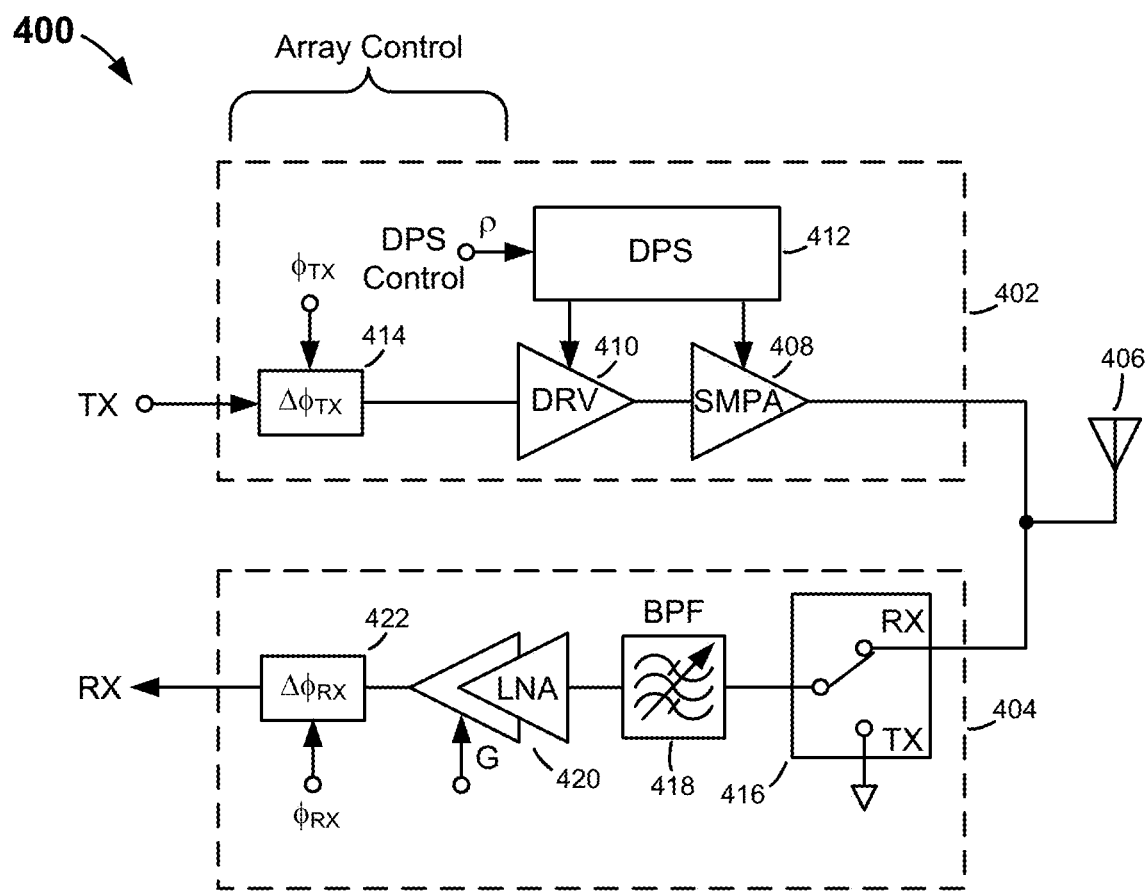
FIG. 12 is a drawing provided to illustrate how the UTR module in FIG. 4 can be configured for operation in a full-duplex communications system.

In addition to its superior SWaP characteristic, the UTR module 400 is very versatile. For example, a plurality of UTR modules 400 can be deployed in radar phased arrays (narrowband or wideband), in communications phased arrays, or even in a single phased array system that can be used alternately or simultaneously for both radar and communications. The UTR modules 400 can also be easily manipulated and configured for operation in half-duplex, full-duplex and full-duplex-like systems, even on-the-fly, according to different channel access methods (e.g., time division multiple access (TDMA), code division multiple access (CDMA), space division multiple access (SDMA), etc.), and according to different communications standards that require different modulation formats. FIG. 12 illustrates, for example, how a UTR module 400 can be configured for operation in a full-duplex communications system, such as in frequency division duplex (FDD) communications. In a full-duplex system, transmitting and receiving occur simultaneously. To support simultaneous transmission and reception, the TX/RX switch 416 of the UTR module 400 is therefore set to the RX position at all times. The DPS 412 sets the TX power and signal envelope variations in the RF TX signal produced at the output of the SMPA 402, in accordance with the DPS control signal applied to the control input ρ of the DPS 412. The phase shift $\Delta\phi_{TX}$ introduced into the transmit path 402 by the transmit-path phase shifter 414 is set and controlled by a transmit path phase-shift control signal $\phi_{TX}$ applied to the phase control input of the transmit-path phase shifter 414. When the UTR module 400 is deployed in a communications phased array system, the phase shifts introduced into the transmit paths 404 by the transmit-path phase shifters 414 in the other UTR modules 400 of the array are also individually set and controlled, so that collectively the phase shifts introduced into the transmit paths 402 of the UTR modules 400 in the array define the transmit beam angle. If directed communications is being used, the transmit path phase-shift control signal applied to the transmit-path phase shifters 414 in each UTR module can also be used to individually and dynamically adjust the phase shift introduced into each of the transmit paths 402 of the UTR modules 400, thereby allowing the communications transmit beam produced by the array to be steered. The phase shift $\Delta\phi_{RX}$ introduced into the receive path 404 by the receive-path phase shifter 422 is set and controlled by the receive-path phase-shift control signal $\phi_{TX}$ applied the phase control input of the receive-path phase shifter 422. When the UTR module 400 is deployed in communications phased array system, the phase shifts introduced by the receive-path phase shifters 422 in the receive paths 404 of the other UTR modules 400 in the array are also individually set and controlled, so that collectively the phase shifts introduced into the receive-paths 404 of the array's UTR modules 400 define the receive array pattern. The receive path phase-shift control signals applied to the receive-path phase shifter 422 in the array's UTR modules 400 can also be individually and dynamically adjusted during receiving, allowing the received array pattern to be dynamically varied and thereby establishing a desired or required receive array pattern. The LNAs 420 in the receive paths 404 of the UTR modules 400 also have gain control inputs which allow their gains G to be individually and dynamically adjusted, in order to further affect the receive array pattern. Finally, the BPF 418 in the receive path 404 of the UTR module 400 is tunable, so that it and the other UTR modules 400 in the array can be tuned to the intended RX frequency. The filter skirts of the BPF 418 also suppress (i.e., filters out) any transmitted signals that might be reflected from the UTR module's antenna element 406 and into the receive path 404 and, when the UTR module 400 is deployed in an array, suppresses reverse signals transmitted by other UTR modules in the array that may be undesirably captured by the antenna element 406 of the UTR module 400 and directed into the receive path 404, thereby protecting the LNA 420 of the UTR module 400 from being damaged and preventing the reflected and reverse signals from distorting the desired receive signal.

The ability to dynamically tune the BPF 418 in the receive path of the UTR module 400 together with the superior phase stiffness of the SMPA 408 allow a phased array system that is FDD-capable to be constructed which has a number of performance advantages over an FDD-capable phased array system constructed from conventional TR modules. For example, constructing an FDD-capable phased array system using the UTR modules 400 has a substantially higher capacity than what can be achieved in an FDD-capable phased array system constructed from conventional TR modules. In conventional TR modules a circulator or a duplexer must be employed to support full-duplex operation and to suppress, to the extent that either is capable, reflected and reverse signals. However, since the circulator and duplexer are restricted to the TX and RX bands for which they are designed and are not adjustable, the ability to suppress reflected and reverse signals is extremely limited and altogether ineffective if FDD operations are to be performed. This constraint, along with the fact that the HPAs in conventional TR modules are linear amplifiers with low phase stiffness, means that for any practical application the only way to construct an FDD-capable phased array system using conventional TR modules is to partition the conventional TR modules so that, for each TX band involved, a first set of conventional TR modules is specifically dedicated for that TX band and, for each RX band that is involved, a second set of conventional TR modules is specifically dedicated for that RX band. In contrast, the UTR module 400 of the present invention does not require either a circulator or a duplexer to suppress reflected and reverse signals. The SMPA 408 is phase-stiff, making it much less affected by reflected and reverse signals than the linear HPA in conventional TR modules. Furthermore, when configured in an array that is FDD-capable, the high phase stiffness property of the SMPA 408 prevents reflected and reverse signals from degrading the transmission characteristics of the UTR modules 400, and the ability of the BPF 418 to be dynamically tuned over a wide range of RX band frequencies prevents reflected and reverse signals from being introduced into the LNAs 420 of the UTR modules 400. Since there is no need to partition the UTR modules 400 in the array so that some are used only for transmitting and others are used only for receiving, the capacity of the system is therefore superior to any FDD-capable phased array system constructed from conventional TR modules.

The ability to dynamically adjust the BPF 418 in each UTR module 400 further results in a lower noise floor than can be achieved in an FDD-capable phased array system constructed from conventional TR modules. When using the UTR modules 400 to construct an FDD-capable phased array system, all of the UTR modules 400 making up the array can be dynamically adjusted from one RX band to another on-the-fly. Since the receive paths of conventional TR modules cannot be tuned to different RX bands, let alone dynamically and on-the-fly, and because the conventional TR modules making up the array must be partitioned in order to support FDD operations, the noise floor of a conventional phased array system constructed using conventional TR modules is necessarily higher than the noise floor in a phased array system constructed using the UTR modules 400 of the present invention. The reason for the higher noise floor is that when a system divides its TR modules over multiple RX bands, the minimum noise floor that is achievable is determined by the sum of the noise in each RX band. Since the noise floor in a phased array system constructed from conventional TR modules is higher in a phased array system constructed using the UTR modules 400, the noise in any single RX band of the conventional phased array system will therefore also be higher than in any RX band of a phased array system constructed from the UTR modules 400.

Figure 13:
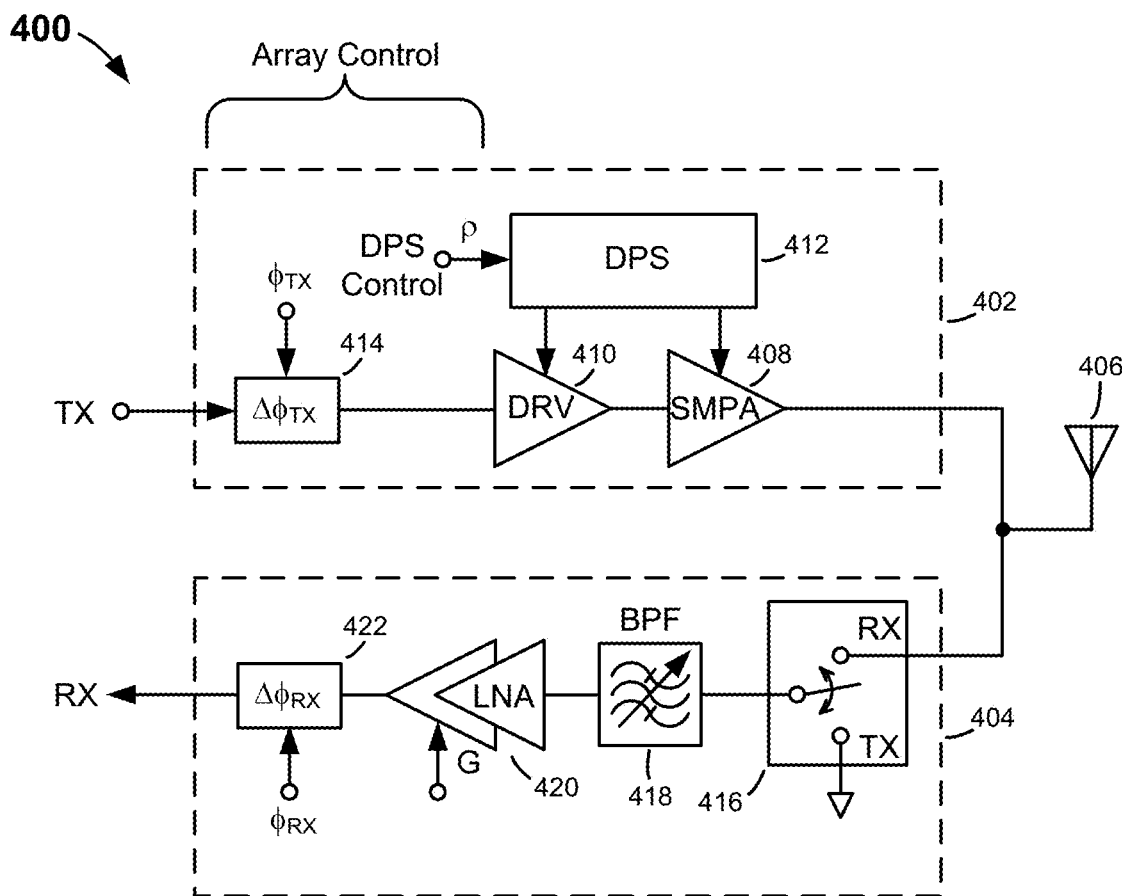
FIG. 13 is a drawing provided to illustrate how the UTR module in FIG. 4 can be configured for operation in a communications system that uses the time division multiple access (TDMA) channel access method.

FIG. 13 illustrates how a UTR module 400 can be configured for operation in a communications phased array system that operates according to the TDMA channel access method or utilizes time division duplexing (TDD). In communications systems that operate according to TDMA and other time division methods, transmitting and receiving occur at different times. Accordingly, the TX/RX switch 416 of the UTR module 400 is set to the TX position during the time slot during which the UTR module 400 is transmitting and is set to the RX position during times the UTR module 400 is receiving. During times when the UTR module 400 is transmitting, the TX/RX switch 416 disconnects the receive path 404 from the antenna element 406, preferably connecting the receive path 404 to ground. If additional isolation beyond that provided by the TX/RX switch 416 is needed, the BPF 418 in the receive path can be off-tuned during transmitting. The remaining components of the UTR module operate similar to as describe above.

It should be mentioned that the TX/RX switch 416 of the UTR module could alternatively be configured outside the receive path 400 and at the antenna element 406 termination point, and operated so that it alternately switches the antenna element termination between the transmit path 402 (during transmitting) and receive path 404 (during receiving). While that alternative approach would allow the UTR module 400 to operate in a communications system that uses time division communications, such as in FIG. 13, it would not allow full-duplex operations, like described in FIG. 12 above. Accordingly, in order to extend the universality of the UTR module 400 and enhance its multi-purpose capabilities when deployed in a phased array, the TX/RX switch 416 of the UTR module 400 is disposed in its receive path 404, as shown in FIGS. 4, 12, 13 and other drawings of this disclosure.

Figure 14:
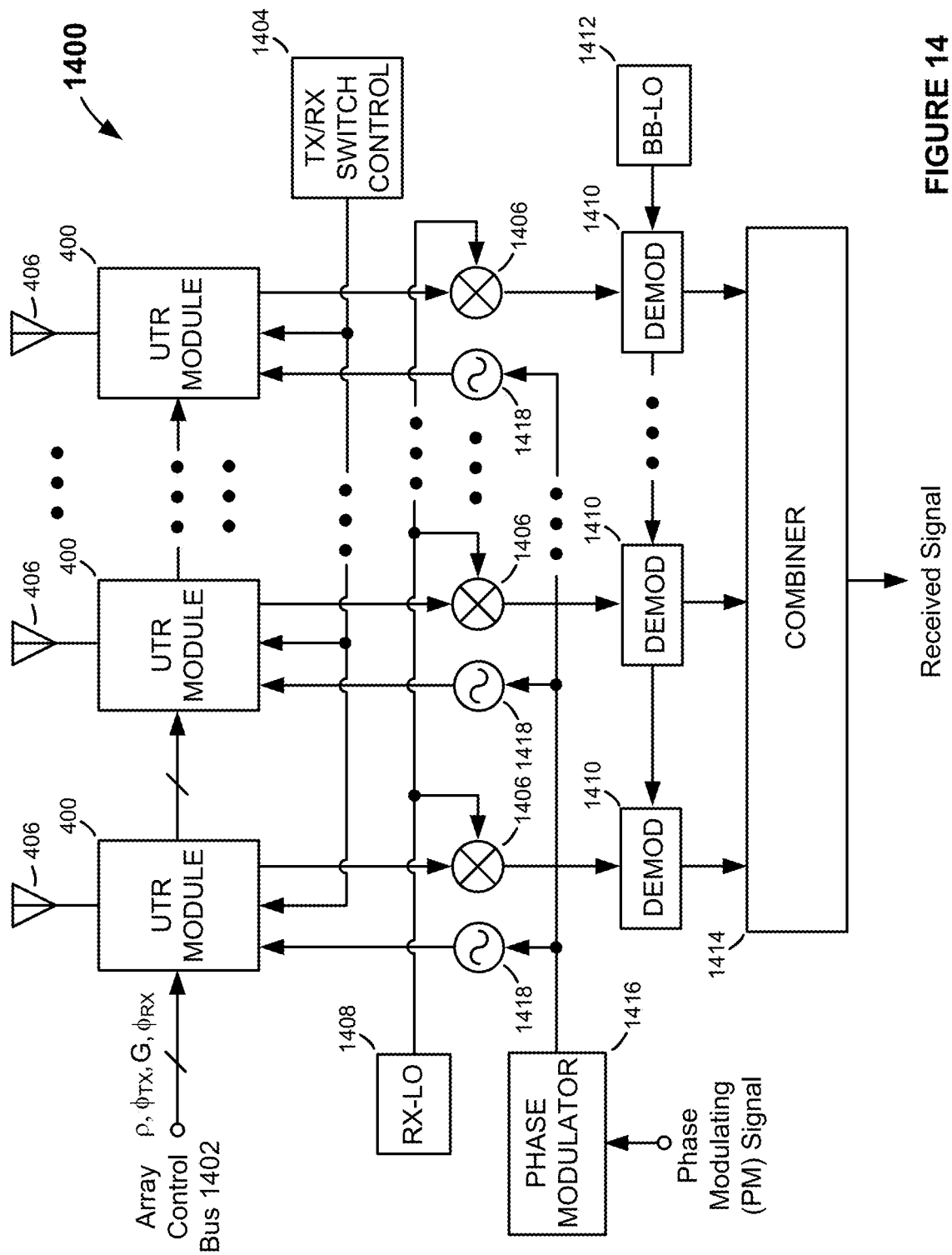
FIG. 14 is a system level drawing of a communications phased array system, according to an embodiment of the present invention.

FIG. 14 is a system level drawing of a communications phased array system 1400, according to an embodiment of the present invention. The communications phased array system 1400 comprises a plurality of UTR modules 400 (similar to as shown and described above in reference to FIG. 4); an array control bus 1402; a TX/RX switch controller 1404; a plurality of RF downconverters 1406; a receiver local oscillator (RX-LO) 1408; a plurality of demodulators 1410; a baseband local oscillator (BB-LO) 1412; a combiner 1414; a phase modulator 1416; and a plurality of voltage controlled oscillators 1418.

The array control bus 1402 is configured to direct individual and independently controllable transmit-path phase-shift control signals $\phi_{TX}$ to the transmit-path phase shifters 414 in the UTR modules 400; individual and independently controllable receive-path phase-shift control signals $\phi_{RX}$ to the receive-path phase shifters 422; individual and independently controllable gain control signals for setting the gains G of the LNAs 420 in the UTR modules 400, and DPS control signals to the DPS control inputs ρ of the DPSs 412 in the UTR modules 400. If directed communications is not being performed, the transmit-path phase-shift control signals $\phi_{TX}$, receive-path phase-shift control signals $\phi_{RX}$, and LNA gain control signals are set to desired values and then not adjusted thereafter. If directed communications is being performed, the array control signals may be adjusted during receiving and transmitting, in order to alter the transmit beam angle and adjust that RX array pattern. The DPS control signals may all be the same or each may be independently controllable, for example, to individually set (and adjust, if applicable) the output powers of the SMPAs 408 in each of the UTR modules 400, and may or may not include (depending on the application) an information bearing or non-information-bearing signal envelope. The TX/RX switch controller 1404 is provided to control the ON/OFF status of the TX/RX switches 416 in the UTR modules 400.

In preparing for receiving, the TX/RX switch controller 1404 in the communications phased array system 1400 directs the TX/RX switches 416 in the UTR modules 400 to set to their RX positions, if they are not already switched to the RX positions. The antenna elements 406 of the UTR modules 400 then transduce the RF electromagnetic waves they intercept into a plurality of electrical received RF signals. The plurality of received RF signals is directed to the receive paths 404 of the UTR modules 400, via their TX/RX switches 416, to the inputs of the BPFs 418. The BPF 418 in each UTR module 400 is tuned (either dynamically or tuned beforehand) to the intended RX frequency, and further serves to filter out any TX reflected signals or any reverse signals undesirably received from other UTR modules 400 which might otherwise be directed into the UTR module's LNA 420. The LNA 420 in each of the UTR modules 400 then amplifies its respective received RF signal and, if applicable, the receive-path phase shifters 422 in the UTR modules 400 individually introduce unique phase shifts in their respective received RF signals, in accordance with the receive-path phase shift control signals $\phi_{RX}$ provided by the array control bus 1402.

After any desired or necessary phase shifting of the received RF signals has been performed by the receive-path phase shifters 422, the received RF signals are downconverted to IF by the plurality of RF downconverters 1406 and RX-LO 1408. The plurality of downconverted IF signals are then demodulated and downconverted to a plurality of baseband signals by the plurality of demodulators 1410 and BB-LO 1412. (Alternatively, the RX signals may be downconverted from RF to baseband directly, i.e., without first being downconverted to IF.) Finally, the combiner 1414 combines the plurality of baseband signals to form the final desired receive signal. It should be mentioned that, whereas the plurality of RF downconverters 1406, RX-LO 1408, plurality of demodulators 1410, and BB-LO 1412 have been shown and described as being external to the UTR modules 400, some or all of these components can be incorporated into the UTR modules 400 and formed on the same PCBs as the other components of the UTR modules 400.

When the communications phased array system 1400 is transmitting, a DPS control signal or a plurality of independently controlled DPS control signals is/are applied to the control inputs p of the DPSs 412 of the UTR modules 400. The single DPS control signal or plurality of different DPS control signals is/are used to set the transmit output power and to cause the DPSs 412 to introduce envelope variations (if any) in the final phase-modulated RF signals produced and transmitted by the UTR modules 400. Meanwhile, the phase modulator 1416 (or, alternatively, a plurality of different phase modulators, each dedicated to a single UTR module 400 transmit path 402) modulates the plurality of RF VCOs 1418 by a phase modulating (PM) signal. (Note that if a plurality of different phase modulators is employed, each phase modulator and associated VCO may also be included on the PCBs of the UTR modules 400.) The phase-modulated RF signal generated by the phase modulator 1416 is split and directed into the TX input of each of the UTR modules 400. Then, the transmit-path phase shifter 414 in each UTR modules 400 independently introduces a unique phase shift to the phase-modulated RF signal being directed through its transmit path 402, according to the transmit path phase-shift control signal applied to its phase control input from the array control bus 1402. If directed communications is being used, the transmit path phase-shift control signals can be individually and dynamically adjusted during transmitting, in order to allow steering of the final communication beam produced by the plurality of antenna elements 406. The resulting phase-shifted phase-modulated RF signals in all UTR modules 400 are then directed to the inputs of their respective drivers 410/SMPAs 408. As directed by its driver 410, the phase-shifted phase-modulated RF signal in each UTR module 400 switches its high-power output transistor in its SMPA 408 (e.g., the high-power GaN-HEMT 522 in FIG. 5, if that implementation is used) ON and OFF, between compressed and cut-off states, while its DPS 412 modulates the drain of the high-power output transistor according to the DPS voltage produced by its DPS 412, thereby superimposing any signal envelope provided in the original DPS control signal onto the high-power RF output signal produced at the output of the SMPA 408. Finally, the antenna elements 406 of all UTR modules 400 all transduce their final high-power modulated RF signals into high-power modulated RF electromagnetic waves and radiate the resulting high-power modulated RF electromagnetic waves into the air or space where they interfere to form a transmit communications beam of the desired power and direction.

It should be mentioned that although the transmit RF signals applied to the UTR modules 400 are described in the communications phased array 1400 above as being phase-modulated RF signals, that is not a necessary condition. In some communications applications, the modulation format used does not include phase modulation. Accordingly, it is not a necessary condition that the transmit RF signals in the communications phased array 1400 (or any of the other exemplary communications phased arrays described herein) be phase modulated before being applied to the transmit path inputs of the UTR modules 400, and will depend on the particular communications application at hand. The same is true for the DPS control signals applied to the DPS control inputs ρ of the DPSs 412. While some modulation formats are envelope varying, some are not. Therefore, while it is possible to incorporate envelope modulation in the DPS control signals, in order to introduce envelope modulation in the final high-power RF transmit signal, incorporating envelope modulation in the DPS control signals is not a necessary condition and will, again, depend on the particular modulation format being used.

Figure 15:
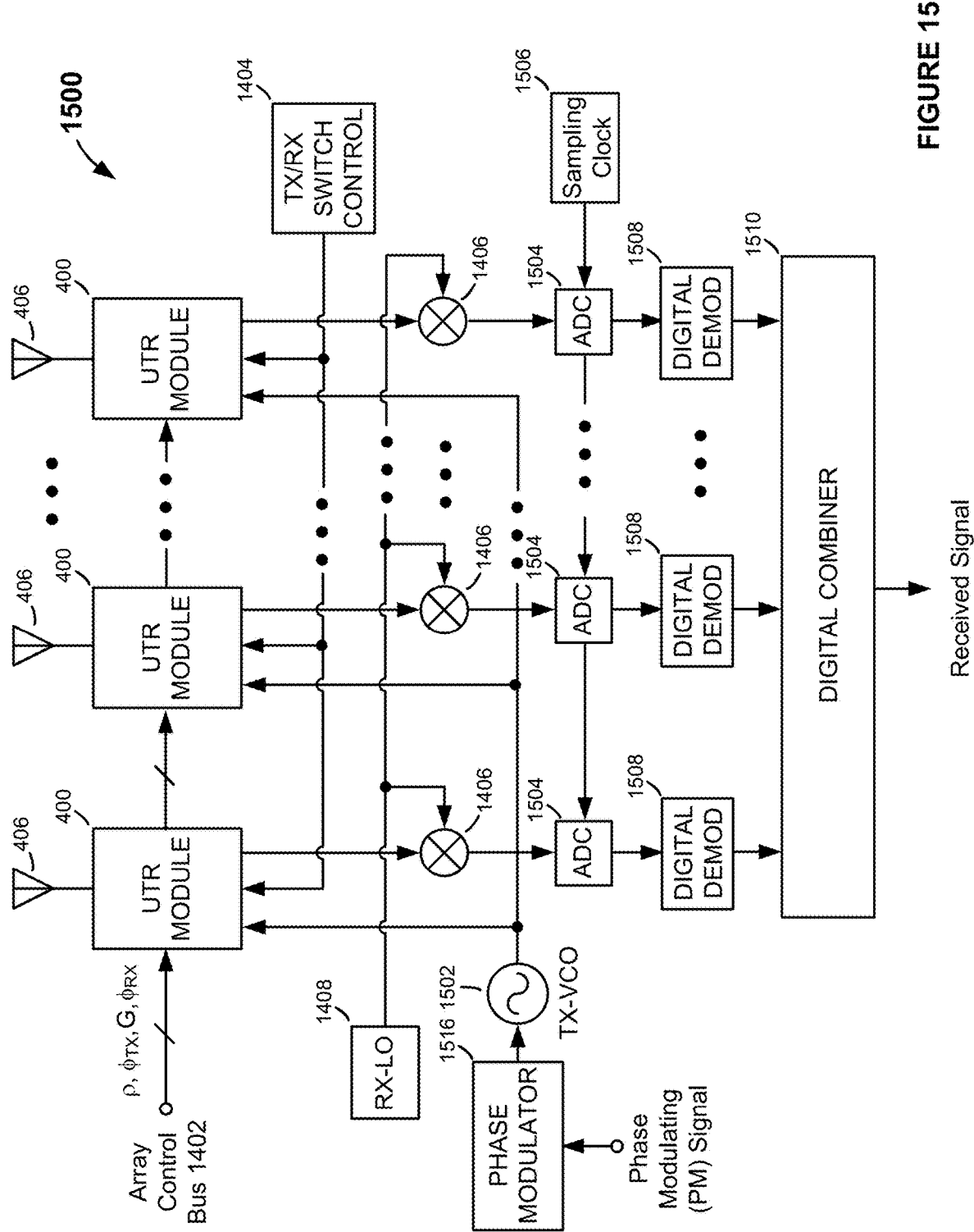
FIG. 15 is a system level drawing of a communications phased array system, according to an embodiment of the present invention.

FIG. 15 is a system level drawing of a communications phased array system 1500, according to another embodiment of the present invention. The communications phased array system 1500 is similar to the communications phased array system 1400 depicted in FIG. 14, but utilizes a single RF TX-VCO 1502 to modulate and upconvert the PM to RF. Another difference is that the communications phased array 1500 utilizes a plurality of analog-to-digital converters (ADCs) 1504 to sample the received IF signals by a sampling clock 1506 and produce a plurality of digital baseband signals, a plurality of digital demodulators 1508 to demodulate the digital baseband signals, and a digital combiner 1510 to combine the demodulated digital baseband signals. It should be noted that, whereas the phase modulator 1516 in the communications phased array system 1500 in FIG. 15 and the phase modulator 1416 in the communications phased array system 1400 in FIG. 14 both operate to modulate their respective TX VCOs directly, the phase modulation could first be performed at baseband or some intermediate transmit frequency and then subsequently upconverted to RF.

Figure 16:
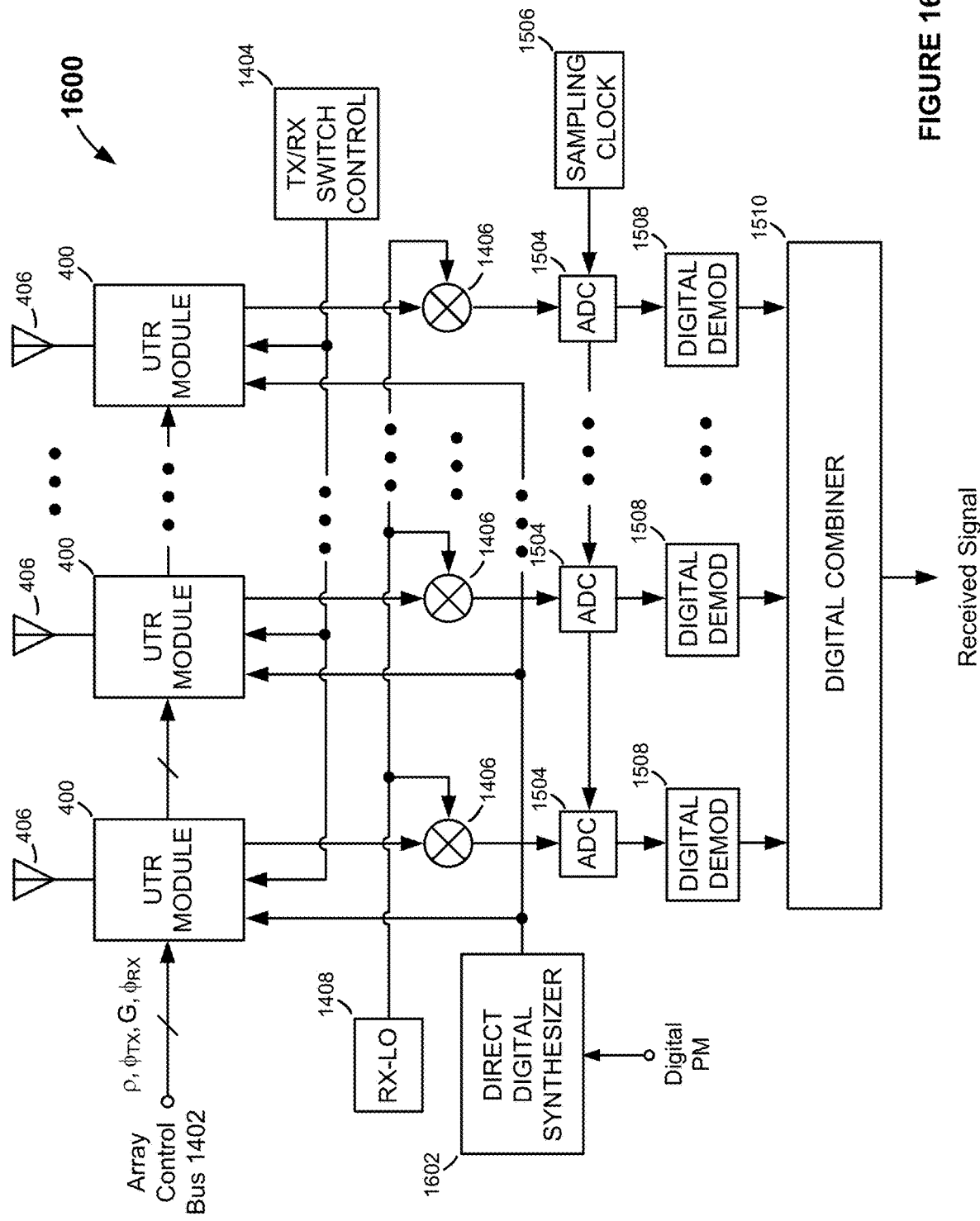
FIG. 16 is a system level drawing of a communications phased array system, according to an embodiment of the present invention.
Figure 17:
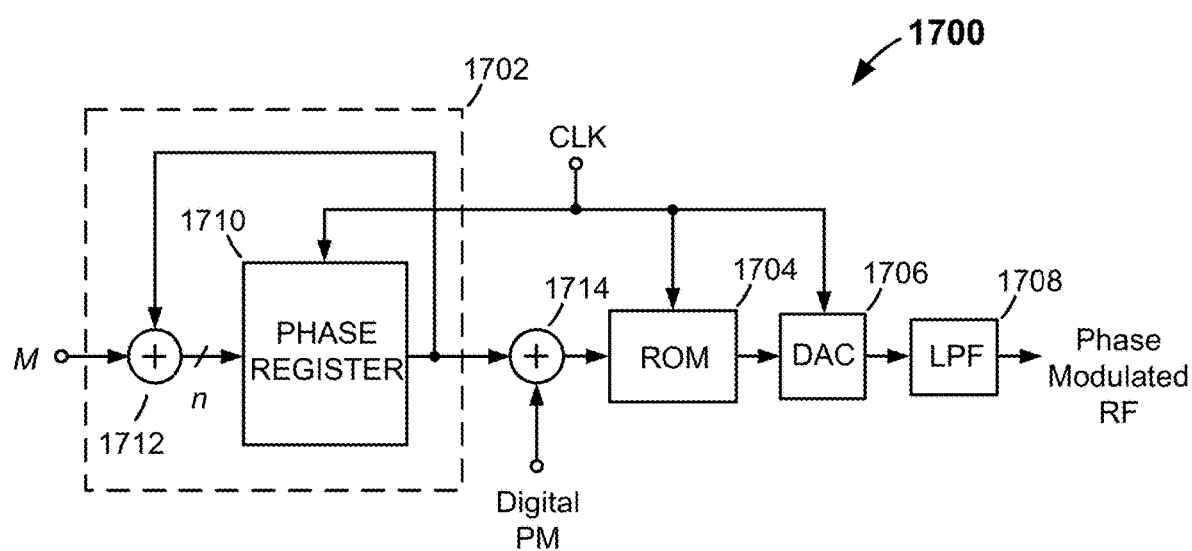
FIG. 17 is a drawing showing the salient elements of a direct digital synthesizer (DDS) that can be used, modified or adapted to produce phase-modulated RF signals for the various communications phased array systems of the present invention.

FIG. 16 is a system level drawing of a communications phased array system 1600, according to another embodiment of the present invention. The communications phased array system 1600 is similar to the communications phased array system 1500 depicted in FIG. 15, but utilizes a direct digital synthesizer (DDS) 1602 to generate the phase-modulated RF signals for the TX inputs of the UTR modules 400. FIG. 17 is a drawing showing the salient elements of a DDS 1700 that can be used, adapted or modified to implement the DDS 1602 in the communications phased array system depicted in FIG. 16, as well as the DDSs used in other embodiments of the invention. The DDS 1700 comprises an n-bit phase accumulator 1702, a read-only memory (ROM) 1704, a digital-to-analog converter (DAC) 1706, and a low-pass filter (LPF) 1708. The phase accumulator 1702 is configured to update (i.e., accumulate) on each cycle of a very high-speed clock (CLK) and store thereupon an n-bit number in its phase register 1710. Also on each cycle of the CLK, the previous value of the n-bit number stored in the phase register 1710 is added to a digital multiplier M, via a summer 1712. The digital multiplier M is determinative of the output frequency (i.e., carrier frequency $f_c = \omega_c/2\pi$) of the DDS 1602. For example, when M=0 . . . 01, the phase accumulator 1702 accumulates for $2^n$ cycles of the CLK, then overflows and restarts, and the output frequency is equal to $\omega_c = 2\pi f_{CLK}/2^n$. When M is greater than 0 . . . 01, the phase accumulator 1702 rolls over M times as fast and the output frequency is equal to $\omega_c = M\pi f_{CLK}/2^n$. Digital PM provided by a baseband processor (not shown) is introduced via a summer 1714 that is disposed in the signal path between the output of the phase accumulator 1702 and the input of the ROM 1704. The resulting digital phase-modulated signal, produced at the output of the summer 1714, serves as an address to a cosine lookup table (LUT) stored in the ROM 1704. Each addressable entry in the LUT maps to a phase point on a cosine wave from 0 to $2\pi$ radians (i.e., 0° to 360°). Therefore, the cosine LUT serves as a phase-to-amplitude converter, directly mapping the phase information in the digital phase-modulated signal into a sequence of digital amplitude words. The digital amplitude words are then converted to an analog waveform by the DAC 1706 and low-pass filtered by the LPF 1708, to produce the final phase-modulated RF signals for the UTR modules 400.

Figure 18:
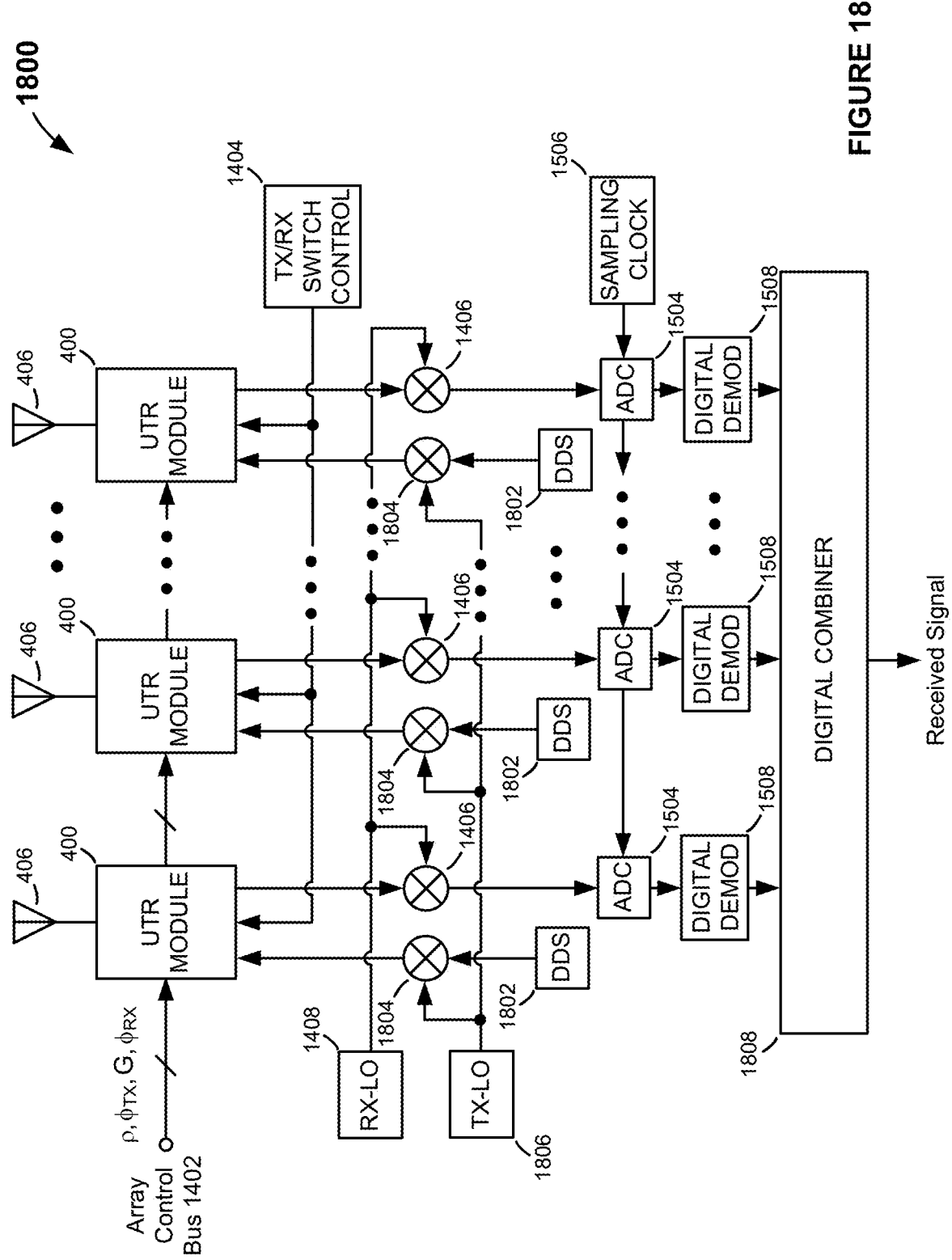
FIG. 18 is a system level drawing of a communications phased array system, according to an embodiment of the present invention.

FIG. 18 is a system level drawing of a communications phased array system 1800, according to another embodiment of the present invention. According to this approach, a plurality of DDSs 1802 is employed. Each DDS 1802 of the plurality of DDSs is dedicated to a single transmit path 404 of an associated UTR module 400. The phase-modulated signals produced by the plurality of DDSs 1802 are upconverted to RF by a plurality of upconverters 1804 and a TX-LO 1806. The resulting plurality of phase-modulated RF signals are then directed to the TX inputs of the plurality of UTR modules 400, where they are then individually phase-shifted by the transmit-path phase shifters 414 (and dynamically adjusted if directed communications is being used) in the transmit paths 402 of the UTR modules 400. After phase shifting, the signals are amplified by the SMPAs 408, to produce a plurality of high-power phase-shifted RF transmits signals, similar to as described above. When the system 1800 is receiving, the TX/RX switch controller 1404 directs the TX/RX switches 416 in the UTR modules 400 to set to their RX positions, if not already set to their RX positions. The antenna elements 406 of the UTR modules 400 then transduce the RF electromagnetic waves that they intercept into a plurality of received RF electrical signals. The plurality of received RF signals is then directed to the receive paths 404 of the UTR modules 400, via their TX/RX switches 416, to the inputs of their BPFs 418. The BPF 418 in each UTR module 400 is tuned to the intended RX frequency, thereby serving to pass the intended RF received signals. The BPF 418 in each UTR module 400 further serves to filter out any TX reflected or reverse signals inadvertently received from other UTR modules that might otherwise be directed into the LNA 420 in its receive path 404. The LNAs 420 in the UTR modules 400 then amplify their respective received RF signals and, if applicable, the receive-path phase shifters 422 individually introduce phase shifts $\Delta\phi_{RX}$ in their respective received RF signals, in accordance with the receive-path phase-shift control signals $\phi_{RX}$ provided via the array control bus 402. The signals are then downconverted to IF by the plurality of RF downconverters 1406 and RX-LO 1408, downconverted to digital baseband signals by the ADCs 1504 and sampling clock 1506, demodulated by the plurality of digital demodulators 1508, and then combined by a digital combiner 1808, to form the desired received signal. It should be noted that whereas the RF upconverters 1804, TX-LO 1806, RF downconverters 1406, RX-LO 1408, ADCs 1504, and digital demodulators 1508 are shown in FIG. 18 as being external to the UTR modules 400, some or all of those components can be included on the UTR modules' PCBs. The same is true for other similar embodiments of the invention.

Figure 19:
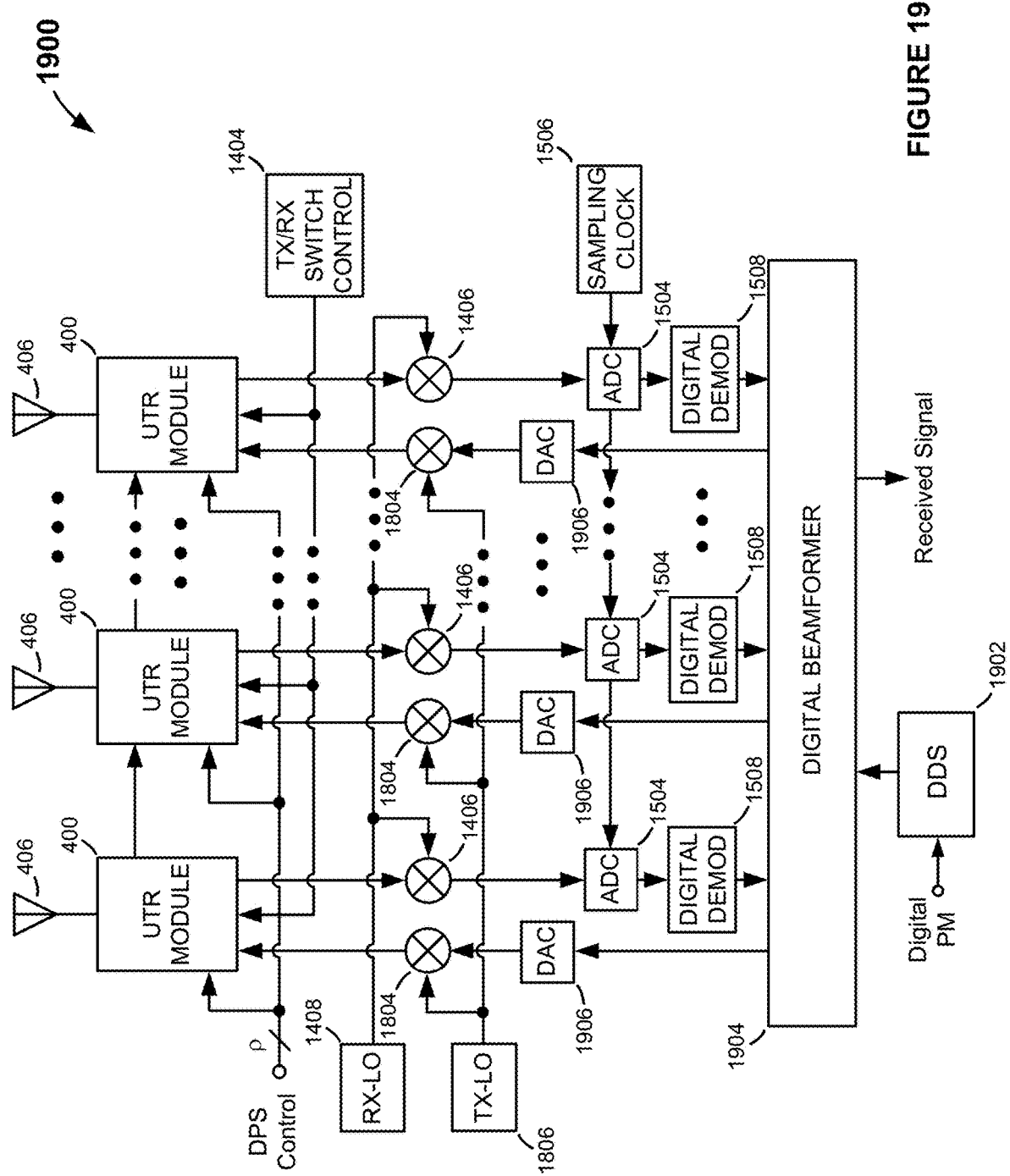
FIG. 19 is a system level drawing of a communications phased array system, according to an embodiment of the present invention.

FIG. 19 is a system level drawing of a communications phased array system 1900, according to another embodiment of the present invention. In this approach, during transmission a single DDS 1902 generates a digital phase-modulated signal at baseband or some intermediate frequency. A digital beamformer 1904 splits the digital phase-modulated signal into a plurality of independent digital phase-modulated signals, which are then converted to analog waveforms by a plurality of DACs 1904, and subsequently upconverted to RF by the plurality of upconverters 1804 and a TX-LO 1806, similar to as in the communications phased array system 1800 shown and described above in reference to FIG. 18. The digital beamformer 1904 also serves to individually set and control the transmit-path phase shifts of the signals transmitted by the UTR modules 400', rather than employing the transmit-path phase-shifters 414 in the UTR modules 400', and individually sets and controls the receive path phase shifts of the signals received by the UTR modules 400', once the received signal have been downconverted to baseband and demodulated, rather than using the receive-path phase-shifters 422. Because the digital beamformer 1904 in this embodiment of the invention is used to set and control the phase shifting of the transmitted and received signals, the transmit-path phase and receive-path phase shifters 414 and 422 in the UTR modules are not needed. Accordingly, the UTR modules of the communications phased array system 1900 in FIG. 19 are labeled using the indicator 400', rather than the indicator 400, to indicate that the UTR modules 400' have a slightly different design (no transmit-path and receive-path phase shifter 414 and 422) compared to the design of the UTR module 400 in FIG. 4. It should be mentioned that the UTR modules 400' could be designed to still include the transmit-path phase and receive-path phase shifters 414 and 422, and if so equipped, they, together with the digital beamformer 1904, could be used to set and control the phase shifts of the transmitted and receive signals. The digital beamformer 1904 may be further configured to control the relative amplitudes of the transmitted and received signals, either by itself or in combination with the gain control signals applied to the LNAs 420 (during receiving) and the DPS control signals applied to the control inputs ρ of the DPSs 412 (during transmitting).

Figure 20:
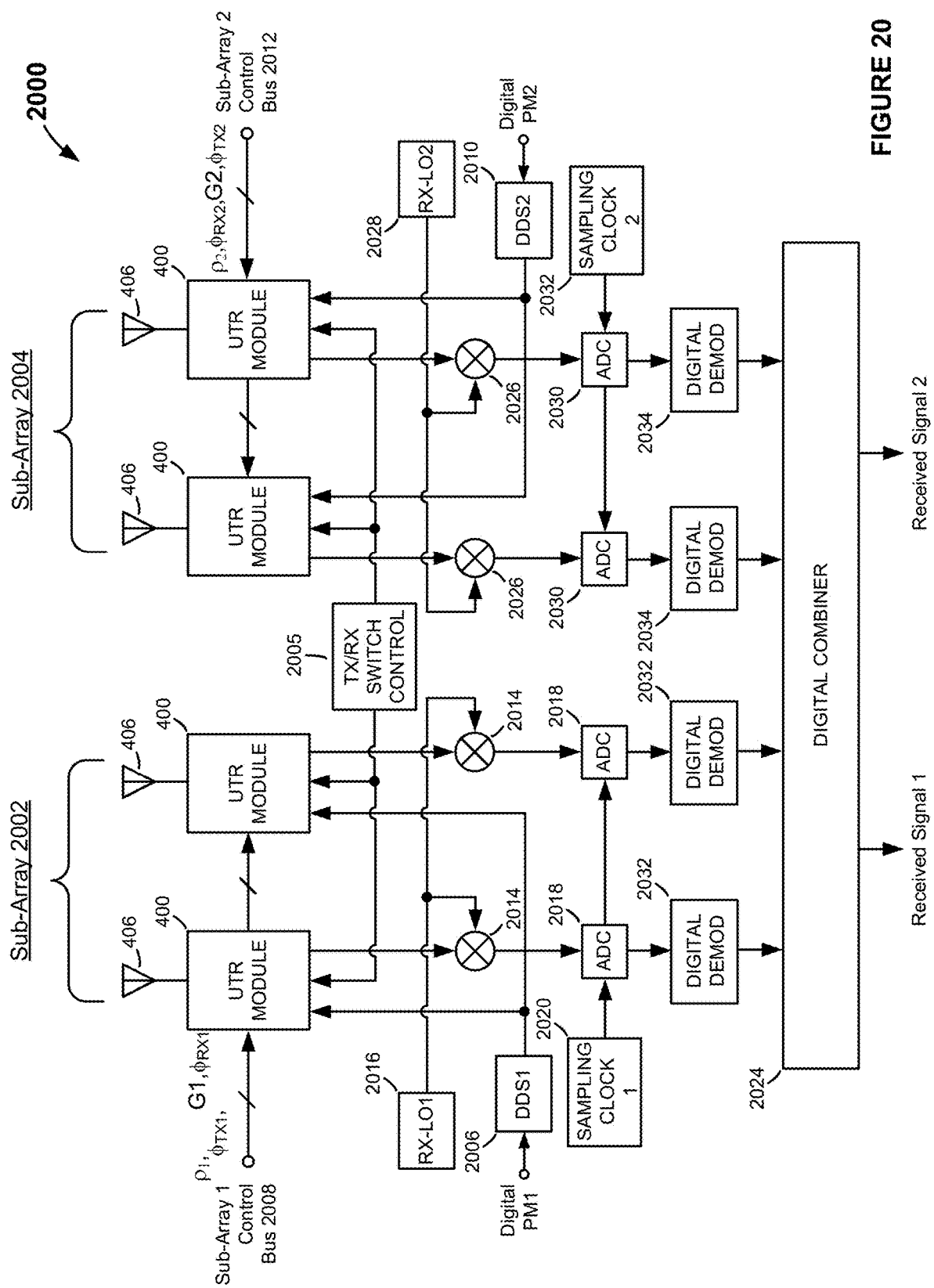
FIG. 20 is a drawing of a multi-purpose communications phased array system, according to an embodiment of the present invention.

FIG. 20 is a drawing of a multi-purpose communications phased array system 2000, according to another embodiment of the present invention. The multi-purpose communications phased array system 2000 includes a first sub-array 2002, which is used for a first communications application, and a second sub-array 2004 that operates independently of the first sub-array 2002 and is used for a second communications application. The distinction between the "first communications application" an "second communications" application may refer to, for example, first and second modulating schemes, first and second communications standards, first and second communications protocols, first and second channel access methods, first and second duplexing methods, or any other communications-related distinction.

When the first sub-array 2002 is preparing for transmitting, the TX/RX switch controller 1404 directs the TX/RX switches of the UTR modules 400 in the first sub-array 2002 to set to their TX positions. A first DDS1 2006 associated with the first sub-array 2002 (or a first plurality of DDSs, similar to as in FIG. 18) then generates a first plurality of phase-modulated signals based on a first digital phase modulating signal PM1 (if the modulation format being used in the first sub-array 2002 includes phase modulation). The first plurality of phase-modulated signals is then upconverted to RF (if not previously upconverted to RF directly) and applied to the transmit inputs of the UTR modules 400 in the first sub-array 2002. The transmit-path phase shifter 414 in each of the first sub-array's UTR modules 400 independently introduces a unique phase shift to the phase-modulated RF signal being directed through its transmit path 402, according to a corresponding transmit path phase-shift control signal applied to the phase control input of the transmit-path phase shifter 414 from a first sub-array control bus 2008. If directed communications is being used, the transmit path phase-shift control signals can be dynamically adjusted as the first sub-array 2002 is transmitting, in order to steer the final communication beam produced by the plurality of antenna elements 406 in the first sub-array 2002. The resulting phase-shifted phase-modulated RF signals in the transmit paths 402 of all of the first sub-array 2002 UTR modules 400 are then directed to the inputs of their respective drivers 410/SMPAs 408. Similar to as explained above, the driver 410 in each UTR module of the first sub-array 2002 switches the high-power output transistor of its associated SMPA 408 ON and OFF, between compressed and cut-off states, while its DPS 412 varies or modulates the drain of the high-power output transistor according to the DPS voltage produced by its DPS 412, thereby superimposing any signal envelope information that may be present in the first DPS control signal (DPS control 1 in FIG. 20) onto the high-power RF output signal produced at the output of the UTR module's SMPA 408. The DPS control signals can also be used to individually set and adjust the output powers produced by the SMPAs 408 in the first sub-array 2002. Finally, the antenna elements 406 of all UTR modules 400 in the first sub-array 2002 transduce their final high-power amplitude and phase modulated RF signals into high-power modulated RF electromagnetic waves and radiate the resulting high-power modulated RF electromagnetic waves into the air or space, where they interfere to form a first sub-array transmit communications beam of the desired power and direction.

Transmitting by the second sub-array 2004 is performed similarly but separately from the first sub-array 2002. It should be mentioned that the demarcation between the first and second sub-arrays 2002 and 2004 may be a physical division of the array (for example, by dividing the UTR modules array into first and separate sub-arrays in which each sub-array has adjacent UTR modules) or may be a logical division in which the UTR modules making up the first and second sub-arrays 2002 are each electronically selected such that the UTR modules making up the first sub-array 2002 are not necessarily adjacent to one another and the UTR modules making up the second sub-array 2004 are also not necessarily adjacent to one another. Whether physically or logically divided, when the second sub-array 2004 is preparing for transmitting, the TX/RX switch controller 1404 directs the TX/RX switches 416 of the UTR modules 400 in the second sub-array 2004 to set to their TX positions. A second DDS2 2010 associated with the second sub-array 2004 (or a second plurality of DDSs, similar to as in FIG. 18) then generates a second plurality of phase-modulated signals using a second digital phase modulating signal PM2 (if the modulation format being used in the second sub-array 2004 includes phase modulation). The second plurality of phase-modulated signals is then upconverted to RF (if not previously upconverted to RF directly) and applied to the transmit inputs of the UTR modules 400 in the second sub-array 2004. The transmit-path phase shifters 414 in each UTR module 400 of the second sub-array 2004 then independently introduces a unique phase shift to the phase-modulated RF signal being directed through its transmit path 402, according to a corresponding transmit path phase-shift control signal applied to the phase control input of the transmit-path phase shifter 414 from a second sub-array control bus 2012. If directed communications is being used in the second sub-array 2002, the transmit path phase-shift control signals can be dynamically adjusted as the second sub-array 2004 is transmitting, in order to steer the final communication beam produced by the plurality of antenna elements 406 in the second sub-array 2004. The resulting phase-shifted phase-modulated RF signals in all of the second sub-array 2004 UTR modules 400 are then directed to the inputs of their respective drivers 410/SMPAs 408. Similar to as explained above, the driver 410 in each UTR module of the second sub-array 2002 switches the high-power output transistor of its SMPA 408 ON and OFF, between compressed and cut-off states, while its DPS 412 varies or modulates the drain of the high-power output transistor according to the DPS voltage produced by its DPS 412, thereby superimposing any signal envelope information that may be present in the second DPS control signal (DPS control 2 in FIG. 20) onto the high-power RF output signal produced at the output of the UTR module's SMPA 408. Finally, the antenna elements 406 of all UTR modules 400 in the second sub-array 2004 transduce their final high-power modulated RF signals into high-power modulated RF electromagnetic waves and radiate the resulting high-power modulated RF electromagnetic waves into the air or space, where they interfere to form a second sub-array transmit communications beam of the desired power and direction.

When the first sub-array 2002 is preparing for receiving, the TX/RX switch controller 2005 directs the TX/RX switches 416 in the UTR modules 400 of the first sub-array 2002 to set to their RX positions, if they are not already switched to their RX positions. The antenna elements 406 of the UTR modules 400 in the first sub-array 2002 then transduce the RF electromagnetic waves they intercept into a first plurality of electrical received RF signals. The first plurality of received RF signals is directed to the receive paths 404 of the UTR modules 400 of the first sub-array 2002, via their TX/RX switches 416, to the inputs of their BPFs 418. The BPF 418 in each UTR module 400 of the first sub-array 2002 is tuned (either dynamically or tuned beforehand) to the intended RX frequency of the first sub-array 2002, and further serves to filter out any TX reflected or reverse signals received from other UTR modules 400 that might otherwise be directed into the LNAs 420 in its receive path 404. The LNAs 420 in the UTR modules 400 of the first sub-array 2002 then amplify their respective received RF signals and, if applicable, the receive-path phase shifters 422 individually introduce unique phase shifts in their respective received RF signals, in accordance with the receive-path phase-shift control signals provided over the first sub-array control bus 2008. The gains G1 of the LNAs 420 in the first sub-array 2002 can also be adjusted to affect the RX pattern of the signal received by the first sub-array 2002. After any necessary phase shifting of the received RF signals has been performed by the receive-path phase shifters 422, the received RF signals in the first sub-array 2002 are down-converted to IF by a first plurality of RF downconverters 2014 and a first sub-array RX-LO1 2016. A first plurality of ADCs 2018 then samples the received IF signals according to a first sub-array sampling clock 2020 at a baseband frequency, and a first plurality of digital demodulators 2032 then demodulates the downconverted digital signals and introduces them to a digital combiner 2024, which finally combines the baseband signals to form the final desired first sub-array 2002 receive signal.

Receiving by the second sub-array 2004 is performed independent of the first sub-array 2002. When the second sub-array 2004 is preparing for receiving, the TX/RX switch controller 2005 directs the TX/RX switches 416 of the UTR modules 400 in the second sub-array 2004 to set to their RX positions, if they are not already in the RX positions. The antenna elements 406 of the UTR modules 400 in the second sub-array 200 then transduce the RF electromagnetic waves they intercept into a second plurality of electrical received RF signals. The second plurality of received RF signals is directed to the receive paths 404 of the UTR modules 400 of the second sub-array 2004, via their TX/RX switches 416, to the inputs of their BPFs 418. The BPF 418 in each UTR module 400 of the second sub-array 2004 is tuned (either dynamically or tuned beforehand) to the intended RX frequency of the second sub-array 2004, and further serves to filter out any TX reflected or reverse signals received from other UTR modules that might otherwise be directed into the LNAs 420 in its receive path 404. The LNAs 420 in the UTR modules 400 then amplify their respective received RF signals and, if applicable, the receive-path phase shifters 422 individually introduce unique phase shifts in their respective received RF signals, in accordance with the receive-path phase-shift control signals provided over the second array control bus 2012. The gains G2 of the LNAs 420 can also be adjusted to affect the RX pattern of the signal received by the second sub-array 2004. After any necessary phase shifting of the received RF signals has been performed by the receive-path phase shifters 422, the received RF signals in the second sub-array 2004 are downconverted to IF by a second plurality of RF downconverters 2026 and a second sub-array RX-LO2 2028. A second plurality of ADCs 2030 then samples the received IF signals according to a second sub-array sampling clock 2032 at a baseband frequency, and a second plurality of digital demodulators 2034 then demodulates the downconverted digital signals and introduces them to the digital combiner 2024, which finally combines the baseband signals to form the final desired second sub-array 2004 receive signal.

Because the first and second sub-arrays 2002 and 2004 operate independently from one another, simultaneous communications according to different channel access methods, different modulation schemes, different communications standards, etc. is possible. For example, the first sub-array 2002 can be configured and controlled to operate in a full-duplex system (similar to as described above in reference to FIG. 12) while the second sub-array 2004 is operating in a communications system that uses the TDMA channel access method. The first sub-array 2002 could also be used for non-steered communications while the second sub-array 2004 is being used for communications that are adaptive and allow the second sub-array 2004 transmit communications beam to be aimed and steered.

In the multi-purpose communications phased array system 2000 in FIG. 20, simultaneous communications according to different communications applications is possible. The wideband agility of the SMPA 408, tunability of the BPFs 418, and controllability of the TX/RX switches 416 in the UTR modules 400 also affords the ability to employ a single phased array for first and second communications applications over time. In other words, any one of the communications phased array systems described in FIGS. 14, 15, 16 and 18 above (or other single phased array system employing the UTR modules 400) can be configured for use in a first communications application and then subsequently reconfigured for use in a second communications application. For example, the UTR modules 400 in any one of those communications phased array systems could be first configured for full-duplex operations (similar to discussed above in reference to FIG. 12) and then reconfigured very rapidly (if necessary), even on-the-fly, for time division communications (similar to discussed above in reference to FIG. 13). This configuration/reconfiguration capability could also be combined with the simultaneous communications capability of the multi-purpose communications phased array system 2000 in FIG. 20, thereby allowing first and second sub-arrays to operate simultaneously according to first and second communications applications and allowing a third sub-array to be configured and reconfigured over time, in order to accommodate third and fourth communications applications.

Figure 21:
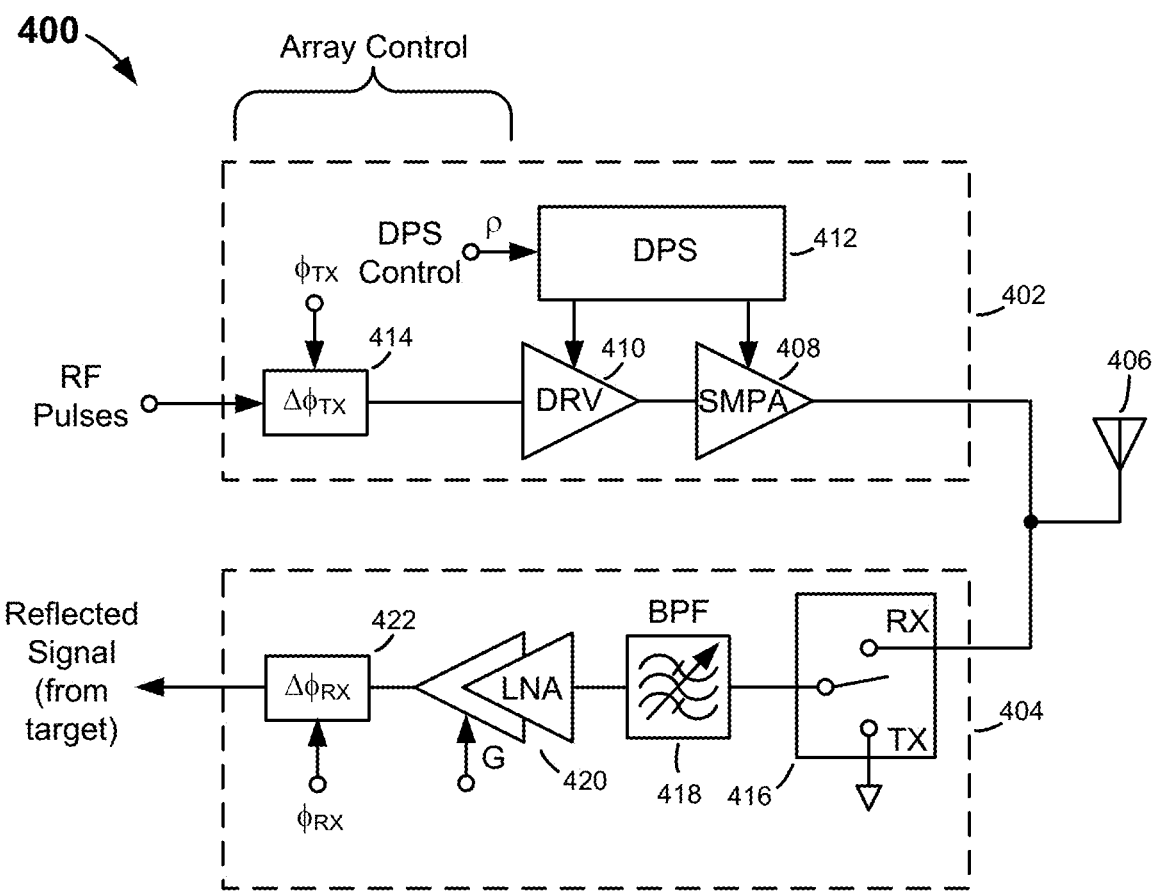
FIG. 21 is a drawing provided to illustrate how the UTR module in FIG. 4 can be configured for use in a radar phased array.

In addition to the ability of the UTR modules 400 of the present invention to being well-suited for communications applications, they are also well-suited for radar applications. FIG. 21 illustrates, for example, how one of the UTR modules 400 can be configured for use in a radar phased array system. In radar phased arrays, a high-frequency RF source (or "exciter") generates low-power, high-frequency RF pulses that are converted into high-power, high-frequency RF pulses. The high-power, high-frequency RF pulses are directed toward a target (for example, a ship, aircraft, guided missile, spacecraft, motor vehicle, weather formation, etc.), upon which they reflect. The reflected RF pulses and their time of flight back to the array allow the target to be identified and its location, direction and speed to be tracked.

When the UTR module 400 is deployed in a radar phased array and the UTR module 400 is transmitting, the TX/RX switch 416 in the receive path 404 of the UTR module 400 (see FIG. 21) is set to the TX position, in order to isolate the receive path 404. (If additional isolation is needed during transmitting, the BPF 418 can be off-tuned to further isolate the receive path 404.) Once the TX/RX switch 416 is set to the TX position, high-frequency RF pulses from the RF source (not shown in FIG. 21) are directed into the transmit path 402 of the UTR module 400. The phase shift $\Delta\phi_{TX}$ introduced into the transmit path 402 by the transmit-path phase shifter 414 is set and controlled by the transmit path phase-shift control signal $\phi_{TX}$ applied to the phase control input of the transmit-path phase shifter 414. When the UTR module 400 is deployed in a radar phased array system, the phase shifts introduced into the transmit paths 404 by the transmit-path phase shifters 414 in the other UTR modules 400 of the array are also individually set and controlled, so that collectively the phase shifts introduced into the transmit paths 402 of the UTR modules 400 in the array define the direction of transmission of the pulsed radar beam radiated by the array's antenna elements 406. If the pulsed radar beam must be steered during transmission, which is normally the case, transmit path phase-shift control signal applied to the transmit-path phase shifters 414 in each UTR module can also be used to individually and dynamically adjust the phase shift introduced into each of the transmit paths 402 of the UTR modules 400. The DPS control signal applied to the control input p of the DPS 412 is used to set the transmit power of the UTR module 400.

To receive the signal reflected from the target, the TX/RX switch 416 in the UTR module 400 is set to the RX position, as are the TX/RX switches 416 in the other UTR modules 400, and the BPF 418 is tuned to the intended RX frequency of the incoming reflected radar pulses. The components in the transmit path 402 (particularly the SMPA 408 and DPS 412) may also be turned off during receiving, in order to conserve power and further isolate the transmit path 402 from the receive path 404. The receive path phase-shift control signals applied to the receive-path phase shifter 422 in the array's UTR modules 400 can also be individually and dynamically adjusted during receiving, allowing the received array pattern to be dynamically varied and thereby establishing a desired or required receive array pattern. The gains G of the LNAs 420 in the UTR modules 400 may also be adjusted to affect the receive array pattern.

Figure 22:
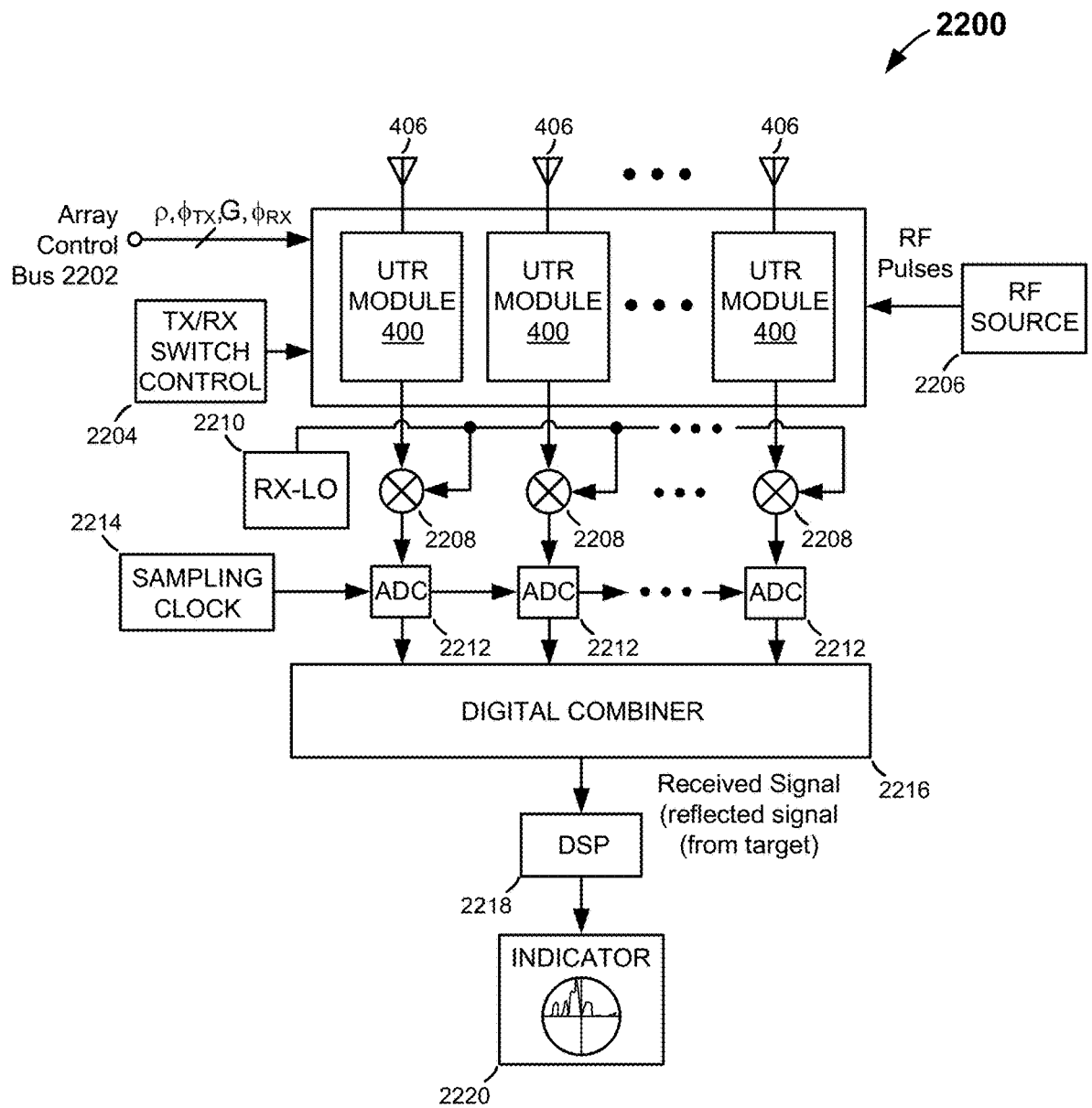
FIG. 22 is a system level of a radar phased array system, according to an embodiment of the present invention.

FIG. 22 is a system level drawing further illustrating how the UTR modules 400 can be configured in a radar phased array system 2200, according to an embodiment of the present invention. When the radar phased array system 2200 is preparing for transmitting, the TX/RX switch controller 2204 directs the TX/RX switches 416 in the UTR modules 400 to set to their TX positions. An RF source 2206 then provides low-power, high-frequency RF pulses to the transmit paths 402 of the UTR modules 400. An array control bus 2202 further provides a plurality of different transmit-path phase control signals $\phi_{TX}$, which uniquely set and control the phase shifts introduced by the transmit-path phase shifters 414 in the plurality of UTR modules 400, and a plurality of different DPS control signals, which are applied to the control inputs p of the DPSs 412 in the UTR modules 400. Alternatively, the same DPS control signal can be applied to all of the UTR modules 400. The phase shifts individually introduced to the RF pulses in the transmit paths 402 of the UTR modules collectively determine the direction of transmission of the final pulsed RF radar beam, and can be dynamically adjusted, as explained above, to steer the pulsed radar beam, during transmission. The DPS control signals applied to the DPS control inputs p of the DPSs 412 in the UTR modules determine the RF output power of the SMPAs 408 and can be individually adjusted to affect the aperture profile of the pulsed RF radar beam, for example, to affect the shape of the main lobe the beam, suppress side lobes, and/or control null placement.

When the radar phased array 2200 is receiving, the array control bus 2202 provides a plurality of different receive-path phase shift control signals, which are used to control the receive path phase shifters 422 and thereby uniquely set and control each phase shift introduced by each receive-path phase shifter to the RF pulses being directed through its associated receive path 404. As mentioned above, the receive-path phase shifters 422 can be dynamically adjusted during transmitting, in order to adjust the receive array pattern to a desired or require receive array pattern. During receiving, the array control bus also provides a plurality of gain control signals, which are applied to the gain control inputs of the LNAs 420 in the UTR modules 400, and which can also be adjusted during transmitting to further affect the receive array pattern. After being filtered by the BPFs 418, amplified by the LNAs 420, and phase-shifted by the receive-path phase shifters 422, the signals are downconverted to IF by a plurality of RF downconverters 2208 and a RX-LO 2210, and then converted to baseband digital signals by a plurality of ADCs 2212 and a sampling clock 2214. Finally the digital baseband signals are combined by a digital combiner 2216, to produce the desired received signal (i.e., the desired signal reflected from the target). (If the received RF pulses include modulation information, which they can in certain applications, the downconverted signals are also demodulated before being introduced into the digital combiner 2216.) The received signal may then be processed by a digital signal processor (DSP) 2218 and directed to an indicator 2220, where the receive array pattern can be displayed for human viewing. It should be noted that whereas the RF downconverters 2208, RX-LO 2210, ADCs 2212 and sampling clock 2214 are shown to be external to the UTR modules 400, some or all of those components can be included on the same PCBs 802 as the other components of the UTR modules 400. It should also be noted that whereas the radar phased array system 2200 is shown to employ a single low-power RF source 2206, a plurality of different low-power RF sources can be used, instead, with each RF source dedicated to one of the transmit paths of the UTR modules 400. The RF sources could also be included on the PCBs 802 of the UTR modules 400.

Figure 23:
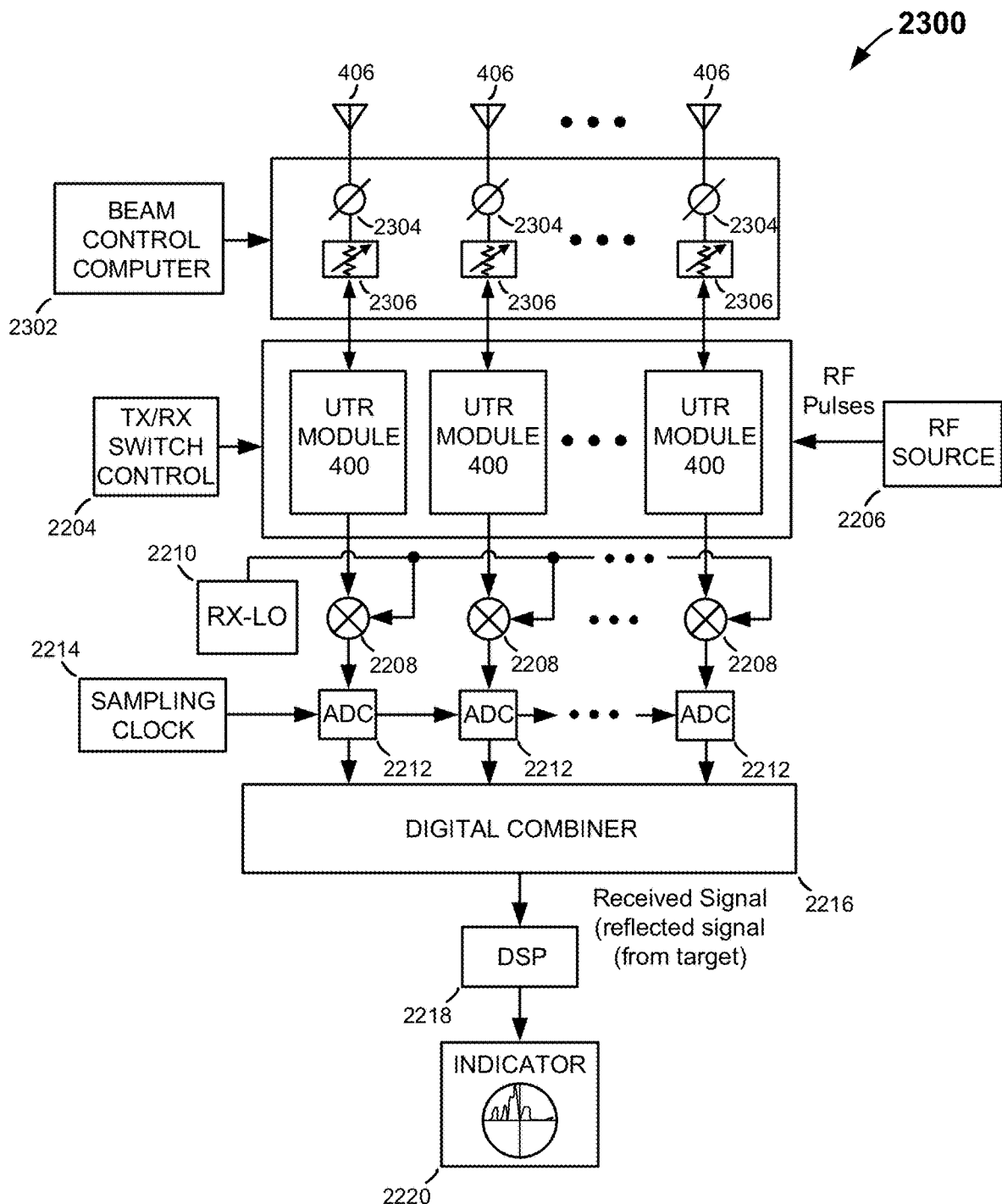
FIG. 23 is a system level drawing of a radar phased array system, according to an embodiment of the present invention.

FIG. 23 is a system level drawing of a radar phased array system 2300, according to another embodiment of the present invention. This embodiment of the invention is similar to the radar phased array 2200 depicted in FIG. 22 but employs a beam control computer 2302 to control the transmit path and receive-path phase shifts and amplitudes of the transmitted and received signals using a plurality of phase shifters 2304 (fixed or adjustable) and a plurality of attenuators 2306 (fixed or adjustable) that are external to the UTR modules 400, instead of using the transmit-path and receive path phase shifters 414 and 422 in the UTR modules 400 to adjust the phases of the transmitted and received signals and instead of using the DPSs 412 and the DPSs 412 to set and control the amplitudes of the transmitted and received signals. (Alternatively, a beamformer configured for operation at baseband or some intermediate frequency could be used, rather than performing the phase and magnitude adjustments of the transmit and receive signals, similar to the communications phased array system describe in reference to FIG. 19 above.) Using this approach, the UTR modules 400 can be designed without the transmit-path and receive path phase shifters 414 and 422 and without adjustable-gain LNAs 420. Alternatively, the beam control computer 2302, plurality of phase shifters 2304, and plurality of attenuators 2306 (or the beamformer, if it is used, instead) can be used in conjunction with the phase-shifting and amplitude controlling capabilities of the UTR modules 400. It should be again noted that whereas the RF downconverters 2208, RX-LO 2210, ADCs 2212, and sampling clock 2214 are shown to be external to the UTR modules 400, some or all of those components can be included on the same PCBs 802 as the other components of the UTR modules 400. Furthermore, whereas only a single RF source 2206 is employed in the radar phased array 2300, again, a plurality of different RF sources can be used for each transmit path, instead, and each RF source can be, though not necessarily, included on the PCB 802 of its associated UTR module 400.

Figure 24:
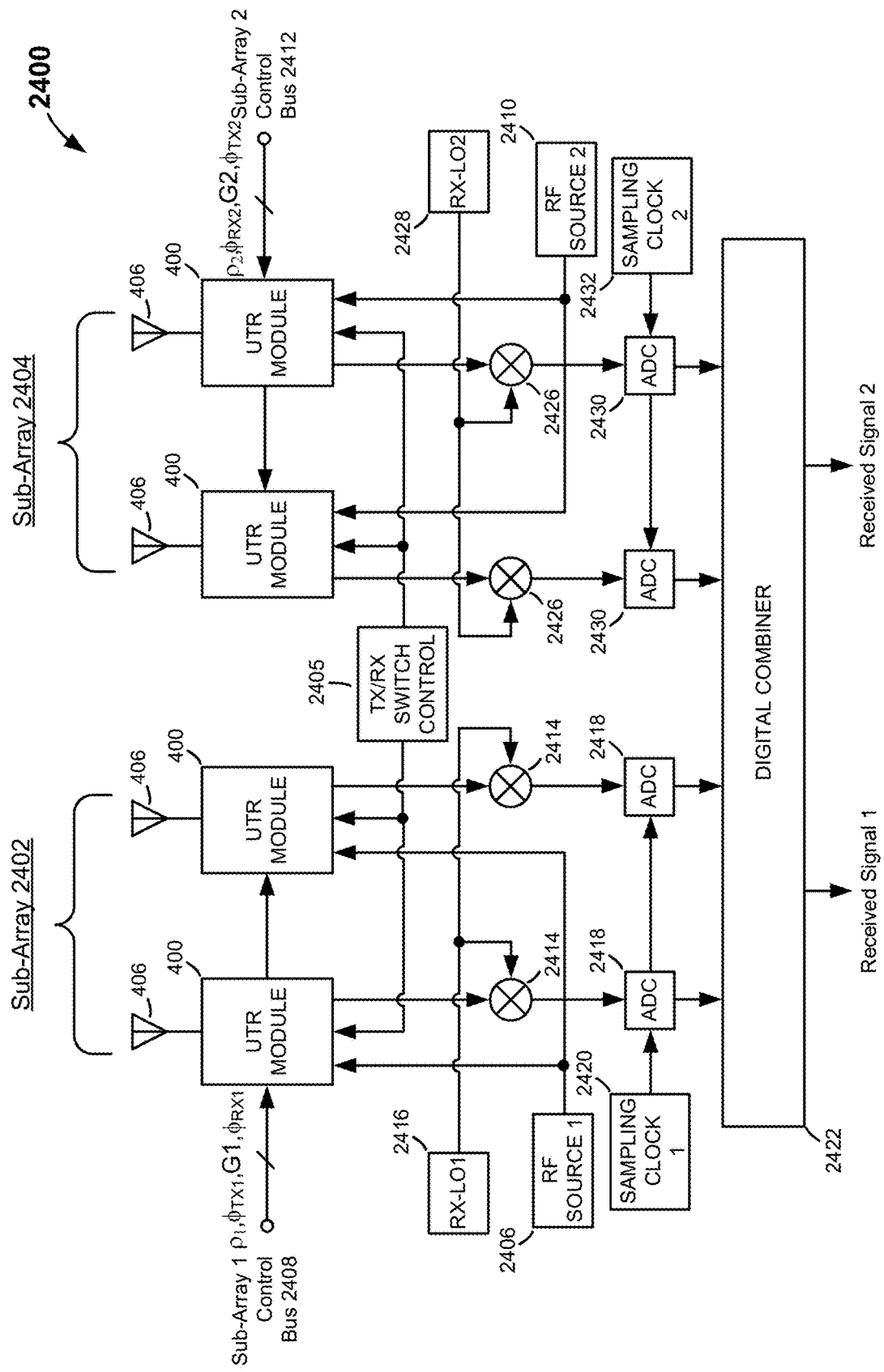
FIG. 24 is a drawing of a multi-purpose radar phased array system, according to an embodiment of the present invention.

The versatility and wideband agility of the UTR modules 400 also affords the ability to use a single radar phased array for multiple radar applications. FIG. 24 is a drawing of a multi-purpose radar phased array system 2400, according to another embodiment of the present invention. The multi-purpose radar phased array system 2400 includes a first sub-array 2402 that is used for a first radar application and a second sub-array 2404 that is used for a second radar application. This embodiment of the invention can be useful in circumstances where multiple moving objects are involved. For example, the first and second sub-arrays 2402 and 2404 can be used to track first and second moving targets simultaneously, or the first sub-array 2402 could be used to track a target (for example, an enemy airplane or ship) while the second sub-array 2404 is being used to guide a missile toward the target.

When the first sub-array 2402 is preparing for transmitting, the TX/RX switch controller 2405 directs the TX/RX switches 416 of the UTR modules 400 in the first sub-array 2402 to set to their TX positions. A first RF source 2406 associated with the first sub-array 2402 (or, alternatively, a first plurality of RF sources dedicated to each of the transmit paths of the UTR modules 400 in the first sub-array 2402) generates a first plurality of RF pulses (which may or may not be modulated with information). The first plurality of RF pulses is upconverted to RF (if not previously upconverted to RF directly) and applied to the transmit paths 402 of the UTR modules 400 in the first sub-array 2402. The phase shifts introduced into the transmit paths 404 by the transmit-path phase shifters 414 in the UTR modules 400 in the first sub-array 2402 are individually set and uniquely controlled by a plurality of transmit-path phase shift control signals provided over a first sub-array control bus 2408. The phase shifts introduced into the transmit paths 402 by all UTR modules 400 in the first sub-array 2402 define the direction of transmission of the pulsed radar beam radiated by the first sub-array's antenna elements 406. If the final first sub-array pulsed radar transmit beam must be steered during transmission, which is normally the case, the transmit-path phase shifters 414 can be individually and dynamically adjusted during transmission. The resulting phase-shifted RF pulses in all of the first sub-array 2402 UTR modules 400 are then directed to the inputs of their respective drivers 410/SMPAs 408. The driver 410 in each UTR module 400 of the first sub-array 2402 switches the high-power output transistor of its associated SMPA 408 ON and OFF, between compressed and cut-off states, while its DPS 412 varies the DPS voltage applied to the drain of the high-power output transistor of the associated SMPA 408, according to the DPS voltage produced by UTR module's DPS 412. Varying the DPS voltage according to the DPS control signal allows the transmit powers of the UTR modules 400 in the first sub-array 2402 to be set and adjusted during transmitting. Finally, the antenna elements 406 of all UTR modules 400 in the first sub-array 2402 transduce their final high-power RF pulses into high-power electromagnetic-wave RF pulses and radiate the resulting high-power electromagnetic-wave RF pulses into the air or space, where they interfere to form a first sub-array pulsed radar transmit beam of the desired power and direction.

When the second sub-array 2402 is preparing for transmitting, the TX/RX switch controller 2405 directs the TX/RX switches 416 of the UTR modules 400 in the second sub-array 2402 to set to their TX positions. A second RF source 2410 associated with the second sub-array 2404 (or, alternatively, a second plurality of RF sources dedicated to each of the transmit paths of the UTR modules 400 in the second sub-array 2404) generates a second plurality of RF pulses (which may or may not be modulated with information). The second plurality of RF pulses is then upconverted to RF (if not previously upconverted to RF directly) and applied to the transmit paths 402 of the UTR modules 400 in the second sub-array 2404. The phase shifts introduced into the transmit paths 404 by the transmit-path phase shifters 414 in the UTR modules 400 in the second sub-array 2404 are individually set and uniquely controlled by a plurality of transmit-path phase shift control signals provided over a second sub-array control bus 2412. The phase shifts introduced into the transmit paths 402 by all UTR modules 400 in the second sub-array 2404 define the direction of transmission of the pulsed radar beam radiated by the second sub-array's antenna elements 406. If the final second sub-array pulsed radar transmit beam must be steered during transmission, the transmit-path phase shifters 414 can be individually and dynamically adjusted during transmission. The resulting phase-shifted RF pulses in all of the second sub-array 2404 UTR modules 400 are then directed to the inputs of their respective drivers 410/SMPAs 408. The driver 410 in each UTR module 400 of the second sub-array 2404 switches the high-power output transistor of its associated SMPA 408 ON and OFF, between compressed and cut-off states, while its DPS 412 varies the DPS voltage applied to the drain of the high-power output transistor of the associated SMPA 408, according to the DPS voltage produced by the DPS 412. Varying the DPS voltage according to the DPS control signal allows the transmit powers of the UTR modules 400 in the second sub-array 2404 to be set and adjusted during transmitting. Finally, the antenna elements 406 of all UTR modules 400 in the second sub-array 2404 transduce their final high-power RF pulses into high-power electromagnetic-wave RF pulses and radiate the resulting high-power electromagnetic-wave RF pulses into the air or space, where they interfere to form a second sub-array pulsed radar transmit beam of the desired power and direction.

During times when the first sub-array 2402 is receiving, the TX/RX switches 416 in the UTR modules 400 of the first sub-array 2402 are set to their RX positions. The antenna elements 406 of the UTR modules 400 in the first sub-array 2402 then transduce the RF electromagnetic waves they receive from a first target into a first plurality of electrical received RF signals. The first plurality of received RF signals is directed to the receive paths 404 of the UTR modules 400 of the first sub-array 2402, via their TX/RX switches 416, to the inputs of their BPFs 418. The BPF 418 in each UTR module 400 of the first sub-array 2402 is tuned (either dynamically or tuned beforehand) to the intended RX frequency of the first sub-array 2402, and further serves to filter out any TX reflected or reverse signals received from other UTR modules 400 that might otherwise be directed into the LNAs 420 in its receive path 404. The LNAs 420 in the UTR modules 400 of the first sub-array 2402 then amplify their respective received RF signals and the receive-path phase shifters 422 individually introduce unique phase shifts in their respective received RF signals, in accordance with the receive-path phase-shift control signals provided over the first sub-array control bus 2408. The phase shifts introduced by the receive-path phase shifters in the receive paths 404 of the UTR modules in the first sub-array 2402 can also be dynamically adjusted during receiving, in order to alter the receive array pattern of the first sub-array 2402 and establish a desired or required receive array pattern. The gains G1 of the LNAs 420 in the first sub-array 2402 can also be adjusted to affect the receive array pattern of the first sub-array 2402. After any desired or necessary phase shifting of the received RF signals has been performed by the receive-path phase shifters 422, the received RF signals in the first sub-array 2402 are downconverted to IF by a first plurality of RF downconverters 2414 and a first sub-array RX-LO1 2416. A first plurality of ADCs 2418 then samples the received IF signals according to a first sub-array sampling clock 2420, thereby producing a plurality of digital baseband signals. Finally, the digital baseband signals are introduced to a digital combiner 2422, which combines the baseband signals to form the final desired first sub-array 2402 receive signal.

Receiving by the second sub-array 2404 is performed independent of the first sub-array 2402. When the second sub-array 2404 is receiving, the TX/RX switches 416 in the UTR modules 400 of the second sub-array 2404 are set to their RX positions. The antenna elements 406 of the UTR modules 400 in the second sub-array 2402 then transduce the RF electromagnetic waves they receive from a second target into a second plurality of electrical received RF signals. The second plurality of received RF signals is directed to the receive paths 404 of the UTR modules 400 of the second sub-array 2404, via their TX/RX switches 416, to the inputs of their BPFs 418. The BPF 418 in each UTR module 400 of the second sub-array 2404 is tuned (either dynamically or tuned beforehand) to the intended RX frequency of the second sub-array 2402, and further serves to filter out any TX reflected or reverse signals received from other UTR modules 400 that might otherwise be directed into the LNAs 420 in its receive path 404. The LNAs 420 in the UTR modules 400 of the second sub-array 2404 then amplify their respective received RF signals and the receive-path phase shifters 422 individually introduce unique phase shifts in their respective received RF signals, in accordance with the receive-path phase-shift control signals provided over the second sub-array control bus 2412. The phase shifts introduced by the receive-path phase shifters in the receive paths 404 of the UTR modules in the second sub-array 2404 can also be dynamically adjusted during receiving, in order to alter the receive array pattern of the second sub-array 2404 and establish a desired or required receive array pattern. The gains G2 of the LNAs 420 in the second sub-array 2404 can also be adjusted to affect the receive array pattern of the second sub-array 2404. After any necessary or desired phase shifting of the received RF signals has been performed by the receive-path phase shifters 422, the received RF signals in the second sub-array 2404 are downconverted to IF by a second plurality of RF downconverters 2426 and a second sub-array RX-LO2 2428. A second plurality of ADCs 2430 then samples the received IF signals according to a second sub-array sampling clock 2432, thereby producing a plurality of digital baseband signals. Finally, the digital baseband signals are introduced to the digital combiner 2422, which combines the baseband signals to form the final desired second sub-array 2404 receive signal.

In the multi-purpose radar phased array system 2400 FIG. 24, simultaneous first and second radar applications is made possible by using the first and second sub-arrays 2402 and 2404. The wideband agility of the SMPA 408, tunability of the BPFs 418, and controllability of the TX/RX switches 416 in the UTR modules 400 also affords the ability to employ a single radar phased array system for first and second radar applications over time. In other words, a single radar phased array system (such as that described in reference to FIG. 22) can be configured for use in a first radar application and then subsequently reconfigured for use in a second radar application. This configuration/reconfiguration capability could also be combined with the simultaneous radar applications capability of the multi-purpose radar phased array system 2400 in FIG. 24, thereby allowing first and second sub-arrays to operate simultaneously according to first and second radar applications and allowing a third sub-array to be configured and reconfigured over time, in order to accommodate third and fourth radar applications.

In some applications it is desirable or necessary for a building, facility, vehicle, or aircraft, etc. to have both radar and communications capabilities. Unfortunately, due to the narrowband constraints of conventional TR modules, two separate phased array systems—a first for radar and a second for communications—must be used when conventional TR modules are used to build the arrays. The need to deploy multiple phased array systems in order to have both radar and communications capabilities is highly undesirable, particularly since powering multiple phased array systems requires large multiple power supplies and large multiple cooling systems. This problem is compounded by virtue of the fact that conventional TR modules have extremely inefficient linear HPAs, which, as explained above, require large heatsinks and large power supplies to compensate for the extremely inefficient HPAs. Conventional TR modules also require large cooling systems to displace the large amount of heat dissipated by the HPAs. The large power supplies, large cooling systems, and large heatsinks not only add substantial cost, size and weight to each TR module, they add to the overall cost, size and weight of each of the separate communications and radar phased array systems. These substantial SWaP performance problems are particularly severe in situations where the separate radar and communications phased array systems are installed in an aircraft, such as a helicopter, airplane, or satellite, or space probe, for example. The separate radar and communications phased array systems not only takes up valuable space in the aircraft, the large and heavy power supplies and cooling systems that are needed to supply power and cool the separate radar and communications phased array systems also take up valuable space and add substantial weight to the aircraft, which adversely affects the ability to maneuver the aircraft.

The unique design and construction of the UTR module 400 of the present invention completely overcome the narrowband operating restriction that plagues conventional TR modules and which prevents them from being used in any other application but for which they are specifically designed. In contrast, the wideband agility of the UTR module 400, the superior phase stiffness of its SMPA 408, the unique placement and controllability of its TX/RX switch 416, and the presence and tunability of its BPF 418 altogether allow a single multi-purpose phased array system to be built that can be used for both radar and communications. Moreover, because the UTR module 400 employs an SMPA, and the SMPA is preferably implemented using GaN technology, the SWaP performance of the UTR module 400 and any phased array system in which the UTR module 400 is employed is substantially superior to the SWaP performance that can be possibly realized using conventional TR modules.

Figure 25:
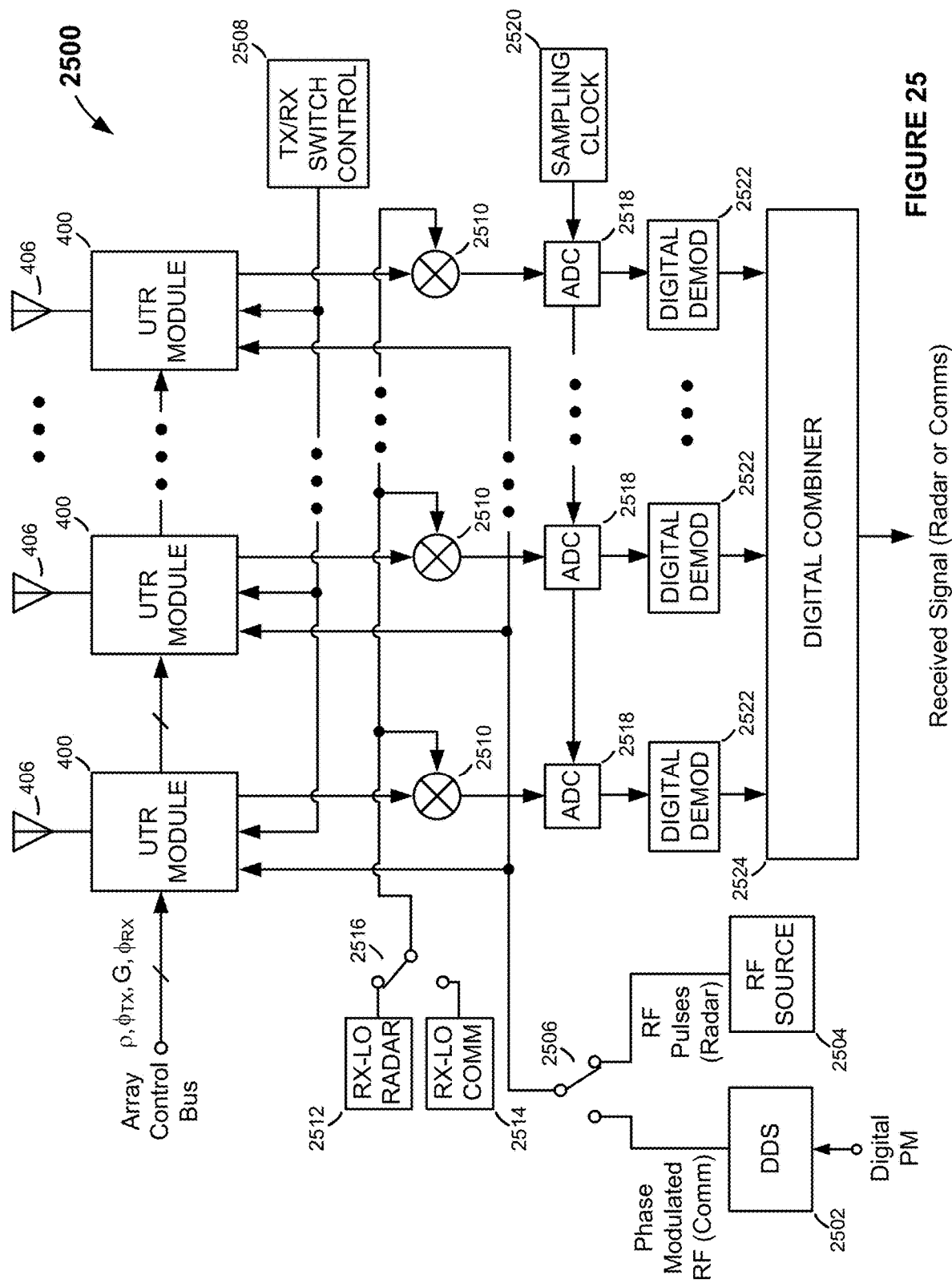
FIG. 25 is a system level drawing of a multi-purpose phased array system that can be used for both radar and communications applications, according to an embodiment of the present invention.

FIG. 25 is a system level drawing of a multi-purpose phased array system 2500 that can be used for both radar and communications applications, according to an embodiment of the present invention. The multi-purpose phased array system 2500 includes a plurality of UTR modules 400 configured to receive, in their transmit paths 402, either a plurality of RF pulses from an RF source 2502 (radar application) or a phase-modulated (or unmodulated) RF communications signal generated by a DDS 2502 (communications application). When the system 2500 is being used for radar, a comms/radar selection switch 2506 is set to the radar (R) position, and when being used for communications is set to the communications (C) position. (It should be mentioned that instead of using a single DDS 2502, single RF source 2504 and a single comms/radar selection switch 2506, a DDS, RF source and comms/radar selection switch can be alternatively employed in each transmit paths 402. The DDS, RF source and/or comms/radar selection switch in each transmit path could then be, though not necessarily, included on the same PCB as the other components of their associated UTR module 400.)

When the system 250 is transmitting, a TX/RX switch controller 2508 directs the TX/RX switches 416 in the UTR modules 400 to set to their TX positions. The transmit-path phase shifter 414, DPS 412, driver 410 and SMPA 408 in each UTR module 400 then operates similar to as described above, to produce either high-power RF pulses (radar application) or a high-power modulated RF communications signal at outputs of the transmit paths 402. The antenna elements 406 of the UTR modules 400 then convert either the high-power RF pulses or high-power RF communications signals into the air or space, where they interfere and combine to produce either a radar transmit beam of the desired power and beam angle (radar application) communications transmit beam of the desired power and beam angle (communications application). When the system 250 is receiving, the TX/RX switches 416 in the UTR modules 400 are set to their RX positions. The antenna elements 406 of the UTR modules 400 then transduce the RF electromagnetic waves that they intercept (either RF pulses reflected from a target (radar application) or RF communications signals received from a remote transmitter) into a plurality of received RF electrical signals. The BPFs 418 in the UTR modules are tuned to the intended radar frequency band (radar application) or to the intended communications frequency (communications application). The LNAs 420 and receive-path phase shifters 422 in the receive paths 422 of the UTR modules operate similar to as discussed above. The amplified and phase-shifted receive RF signals are then downconverted to IF by a plurality of RF downconverters 2510, using either a radar RX-LO 2512 or a communications RX-LO 2514, as selected by an LO selection switch 2516. The downconverted signals are then downconverted from IF to baseband using a plurality of ADCs 2518 and sampling clock 2520, demodulated (if necessary) by a plurality of digital demodulators 2522, and finally combined by a digital combiner 2524, to form the final received radar or communications signal. (It should be noted, that rather than employing a single radar RX-LO 2512, single communications RX-LO 2514, and single LO selection switch 2516, a radar RX-LO, communications RX-LO, and LO selection switch can be alternatively employed in each receive path 404. The radar RX-LO, communications RX-LO, and LO switch in each receive path 404 could then be, though not necessarily, included on the same PCB as the other components of their associated UTR module 400. Furthermore, the RF downconverter 2510, ADC 2518 and/or demodulator 2522 in each receive path could be, though not necessarily, included on the same PCB as the other components of their associated UTR module 400.)

Figure 26:
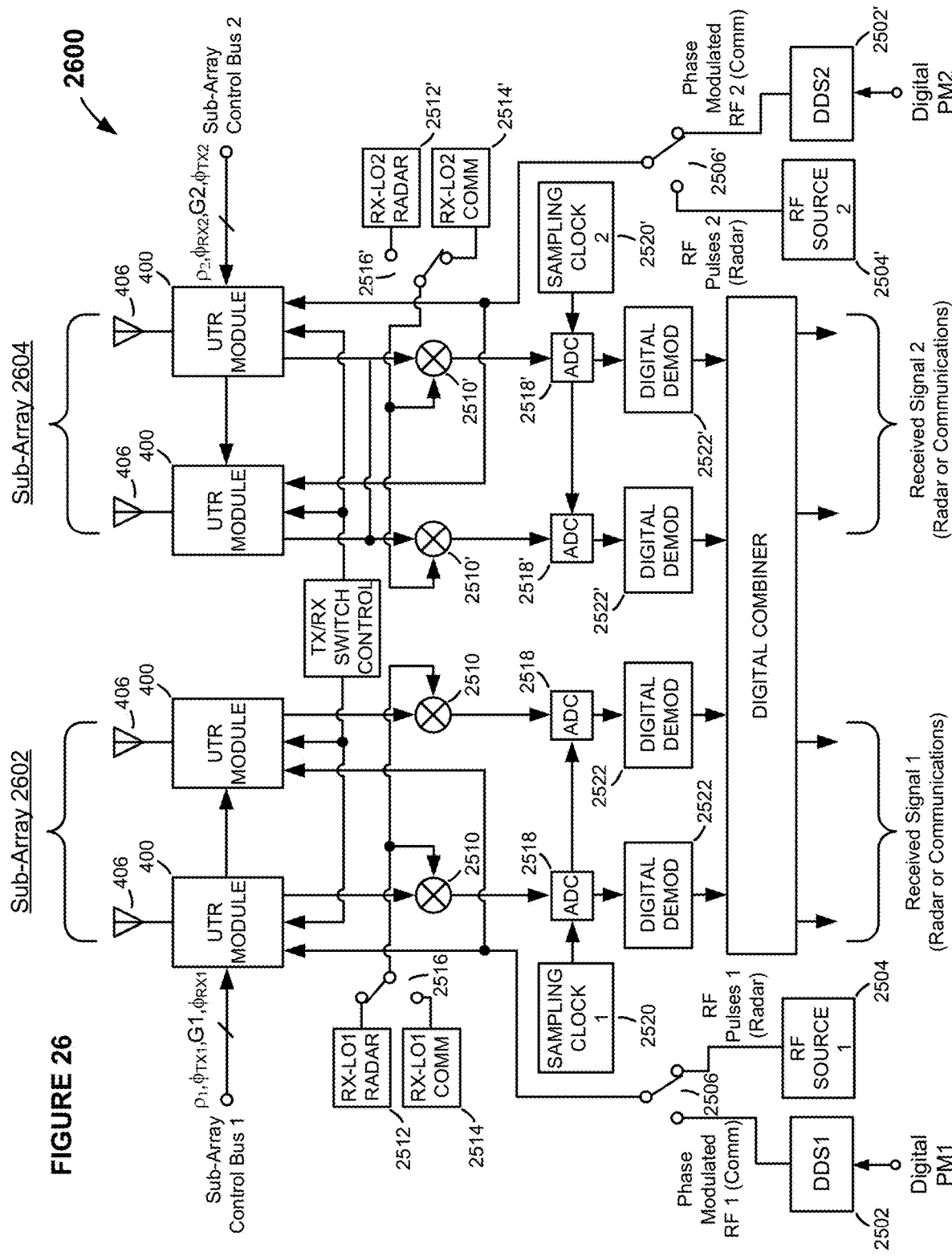
FIG. 26 is a system level drawing of a multi-purpose phased array system that can be used for both radar and communications applications, according to an embodiment of the present invention.

The multi-purpose phased array system 2500 depicted in FIG. 25 allows both radar and communications applications to be performed using the same phased array. However, it is not designed to allow radar and communications to be performed simultaneously. FIG. 26 is a system level drawing of a multi-purpose phased array system 2600 that can be used to perform radar operations and communications simultaneously, according to an embodiment of the present invention. This embodiment of the invention also allows two different communications applications to be performed simultaneously (similar to as described above in reference to FIG. 20) or two different radar applications to be performed simultaneously (similar to as described above in reference to FIG. 24). The multi-purpose phased array system 2600 comprises first and second sub-arrays 2602 and 2604, each of which operates separately from the other. The operation of each sub-array 2602 and 2604 is similar to the operation of the multi-phased array system 2500 depicted in FIG. 25 (except for allowing simultaneous radar and communications) and the operations of the multi-purpose communications phased array system 2000 in FIG. 20 and the multi-purpose radar phased array system 2400 in FIG. 24 (except for allowing both radar and communications), so need not be described further, as those of ordinary skill in the art will understand its operational capabilities by referencing the descriptions of those and other embodiments of the invention described above.

While various embodiments of the present invention have been presented, they have been presented by way of example and not limitation. It will be apparent to persons skilled in the relevant art that minor changes in form and detail may be made to the exemplary embodiments without departing from the true and overall spirit and scope of the invention. Accordingly, the scope of the invention should not be limited by the specifics of the exemplary embodiments of the invention set forth above but, instead, should be determined by the appended claims, including the full scope of equivalents to which such claims are entitled.

What is claimed is:

1. A multi-purpose phased array, comprising: a plurality of transmit-receive (TR) modules, each TR module of the plurality of TR modules including a transmit path, a receive path, and an antenna element that is shared by the transmit and receive paths,
   wherein each TR module of the plurality of TR modules further includes its own power amplifier (PA) configured in the transmit path of said each TR module and having an output terminal that remains electrically coupled to the antenna element of said each TR module during all times said each TR module is transmitting and all times said each TR module is receiving, and
   wherein each TR module of the plurality of TR modules further includes a switch that is disposed entirely within the receive path of said each TR module and not connected to the transmit path of said each TR module, and operable to control whether an input of the receive path of said each TR module is electrically coupled to or electrically isolated from the antenna element of said each TR module.

2. The multi-purpose phased array of claim 1, wherein the receive path is separate and distinct from, and does not share any portion of, the transmit path.

3. The multi-purpose phased array of claim 1, wherein the plurality of TR modules is configurable to facilitate radar operations, which involve transmitting radar signals to a remote object or target and receiving reflected radar signals from the remote object or target, and configurable to facilitate communications operations, which involve transmitting information-bearing radio frequency (RF) transmit signals to a remotely located RF communications receiver and receiving information-bearing RF receive signals from a remotely located RF communications transmitter.

4. The multi-purpose phased array of claim 3, wherein the transmit paths of the plurality of TR modules comprise a plurality of transmit-path phase shifters configured and controlled to affect a beam direction of a transmit beam produced by the multi-purpose phased array.

5. The multi-purpose phased array of claim 3, wherein the transmit paths of the plurality of TR modules further comprise a plurality of dynamic power supplies (DPSs) configured and controlled to set a transmit power level of a transmit beam produced by the multi-purpose phased array.

6. The multi-purpose phased array of claim 5, wherein the plurality of DPSs is further configured and controlled to affect a signal envelope variation of a transmit signal contained within the transmit beam, in circumstances where the plurality of TR modules is configured to facilitate communications operations.

7. The multi-purpose phased array of claim 3, wherein the receive paths of the plurality of TR modules further comprise a plurality of receive-path phase shifters configured and controlled to affect a receive array pattern.

8. The multi-purpose phased array of claim 3, wherein the entire plurality of TR modules is configured and controlled to perform a radar operation during a first time period and configured and controlled to perform a communications operation during a second and different time period.

9. The multi-purpose phased array of claim 3, wherein the entire plurality of TR modules is configured and controlled to perform a first radar operation during a first time period and configured and controlled to perform a second radar operation during a second and different time period.

10. The multi-purpose phased array of claim 3, wherein the entire plurality of TR modules is configured and controlled to perform a first communications operation during a first time period and configured and controlled to perform a second communications operation during a second and different time period.

11. The multi-purpose phased array of claim 10, wherein the first communications operation is in accordance with a first communications standard and the second communications operation is in accordance with a second communications standard different from said first communications standard.

12. The multi-purpose phased array of claim 3, wherein the plurality of TR modules comprises a first plurality of TR modules configured and controlled to perform a first radar operation and a second plurality of TR modules configured and controlled to perform a second radar operation.

13. The multi-purpose phased array of claim 3, wherein the plurality of TR modules comprises a first plurality of TR modules configured and controlled to perform a radar operation and a second plurality of TR modules configured and controlled to perform a communications operation.

14. The multi-purpose phased array of claim 3, wherein the plurality of TR modules comprises a first plurality of TR modules configured and controlled to perform a first communications operation and a second plurality of TR modules configured and controlled to perform a second communications operation.

15. The multi-purpose phased array of claim 14, wherein the first communications operation is in accordance with a first communications standard and the second communications operation is in accordance with a second communications standard different from said first communications standard.

16. The multi-purpose phased array of claim 1, wherein the plurality of TR modules comprises a first plurality of TR modules configured and controlled to facilitate frequency-division communications and a second plurality of TR modules configured and controlled to facilitate time-division communications.

17. The multi-purpose phased array of claim 1, wherein the plurality of TR modules is operable to facilitate frequency-division duplexing over multiple transmit (TX) and receive (RX) bands.

18. The multi-purpose phased array of claim 1, wherein the receive path in said each of the TR modules includes a tunable bandpass filter (BPF) that is tunable over multiple receive frequency bands.

19. The multi-purpose phased array of claim 18, wherein the BPF is dynamically tunable to various receive bands as the multi-purpose phased array operates.

20. The multi-purpose phased array of claim 1, wherein said each of the TR modules does not include a circulator and does not include a duplexer.

21. The multi-purpose phased array of claim 1, wherein the multi-purpose phased array does not include a circulator and does not include a duplexer.

22. The multi-purpose phased array of claim 1, wherein the multi-purpose phased array has a decade-bandwidth capability and the PA of said each of the TR module has a total amplifier efficiency (TAE) of 50% or greater over the entire decade bandwidth.

* * * * *